United States Patent [19]

Conley

[11] Patent Number: 5,697,046

[45] Date of Patent: Dec. 9, 1997

[54] COMPOSITE CERMET ARTICLES AND METHOD OF MAKING

[75] Inventor: Edward V. Conley, North Huntingdon, Pa.

[73] Assignee: Kennametal Inc., Latrobe, Pa.

[21] Appl. No.: 466,861

[22] Filed: Jun. 6, 1995

Related U.S. Application Data

[62] Division of Ser. No. 363,147, Dec. 23, 1994, Pat. No. 5,541,006.

[51] Int. Cl.$^6$ ............................................. B22F 7/06
[52] U.S. Cl. ........................ 428/547; 428/548; 428/552; 428/564; 428/565
[58] Field of Search .................................. 428/547, 548, 428/551, 552, 558, 559, 564, 565

[56] References Cited

U.S. PATENT DOCUMENTS

| | | | |
|---|---|---|---|
| 2,888,247 | 5/1959 | Haglund | 255/63 |
| 3,850,368 | 11/1974 | Boeckeler | 233/25 |
| 3,888,662 | 6/1975 | Boeckeler | 75/203 |
| 3,909,895 | 10/1975 | Abrahamson et al. | 29/95 A |
| 4,194,790 | 3/1980 | Kenny et al. | 299/79 |
| 4,249,955 | 2/1981 | Grab et al. | 106/308 Q |
| 4,359,335 | 11/1982 | Garner | 75/208 R |
| 4,484,644 | 11/1984 | Cook et al. | 175/410 |
| 4,491,559 | 1/1985 | Grab et al. | 419/36 |
| 4,610,931 | 9/1986 | Nemeth et al. | 428/547 |
| 4,705,124 | 11/1987 | Abrahamson et al. | 175/410 |
| 4,722,405 | 2/1988 | Langford, Jr. | 175/374 |
| 4,743,515 | 5/1988 | Fischer et al. | 428/698 |
| 4,820,482 | 4/1989 | Fischer et al. | 419/15 |
| 4,854,405 | 8/1989 | Stroud | 175/374 |
| 4,956,012 | 9/1990 | Jacobs et al. | 75/236 |
| 5,074,623 | 12/1991 | Hedlund et al. | 299/79 |
| 5,250,367 | 10/1993 | Santhanam et al. | 428/698 |
| 5,333,520 | 8/1994 | Fischer et al. | 76/108.2 |
| 5,335,738 | 8/1994 | Waldenstrom et al. | 175/420.2 |
| 5,467,669 | 11/1995 | Stroud | 76/108.2 |
| 5,543,235 | 8/1996 | Mirchandani et al. | 428/547 |

FOREIGN PATENT DOCUMENTS

| | | |
|---|---|---|
| 1119850 | 3/1982 | Canada. |
| 0111600 | 6/1984 | European Pat. Off.. |

(List continued on next page.)

OTHER PUBLICATIONS

"Cemented Carbide in High Pressure Equipment", B. Zetterlund, *High Pressure Engineering*, vol. 2 (1977), pp. 35–40 No month available.

(List continued on next page.)

*Primary Examiner*—Kathryn L. Gorgos
*Assistant Examiner*—Chrisman D. Carroll
*Attorney, Agent, or Firm*—Stanislav Antolin

[57] ABSTRACT

Methods for making, methods for using and articles comprising ferromagnetic cermets, preferably cemented carbides and more preferably tungsten carbide, having at least two regions exhibiting at least one property that differs are discussed. The multiple-region cermets are particularly useful in wear applications. The cermets are manufactured by juxtaposing and densifying at least two powder blends having different properties (e.g., differential carbide grain size or differential carbide chemistry or differential binder content or differential binder chemistry or differential magnetic saturation or any combination of the preceding). Preferably, a first region of the cermet comprises a first hard component having a prescribed binder content and a first magnetic saturation and a second region, juxtaposing or adjoining the first region, comprising a second binder content different than the binder content of the first region and a second magnetic saturation different than that of the first region. These articles have an extended useful life relative to the useful life of monolithic cermets in such applications as, for example, wear. The multiple region cermets of the present invention may be used with articles comprising tools for materials manipulation or removal including, for example, mining, construction, agricultural, and machining applications.

49 Claims, 12 Drawing Sheets

FOREIGN PATENT DOCUMENTS

| | | |
|---|---|---|
| 0233162 | 8/1987 | European Pat. Off. . |
| 0498781 | 8/1992 | European Pat. Off. . |
| 0542704 | 5/1993 | European Pat. Off. . |
| 2343885 | 10/1977 | France . |
| 3005684 | 8/1981 | Germany . |
| 3519101 | 12/1986 | Germany . |
| 659765 | 10/1951 | United Kingdom . |
| 806406 | 12/1958 | United Kingdom . |
| 911461 | 11/1962 | United Kingdom . |
| 1115908 | 6/1968 | United Kingdom . |
| 2004315 | 3/1979 | United Kingdom . |
| 2017153 | 10/1979 | United Kingdom . |
| 2037223 | 7/1980 | United Kingdom . |

OTHER PUBLICATIONS

"Utilization of Magnetic Saturation Measurements for Carbon Control in Cemented Carbides", D. R. Moyle & E. R. Kimmel, *1984 ASM/SCTE Conference on Technology Advancements in Cemented Carbide Production*, Pittsburgh, PA 2–4 Dec. 1984, also available as *Metals/Materials Technology Series No. 8415–009* (1984), pp. 1–5, American Society for Metals, Metals Park, Ohio No month avialable.

"Binder Mean–Free–Path Determination in Cemented Carbide by Coercive Force and Material Composition", R. Porat & U. Malek, *Materials Science and Engineering*, vol. A105/106 (1988), pp. 289–292 No month avialable.

"Standard Practice for Evaluating Apparent Grain Size and Distribution of Cemented Tungsten Carbides", ASTM Designation B–390–92, *1992 Annual Book of ASTM Standards*, vol. 02.05, pp. 156–159 No month available.

"Isotropic and Gradient Hard Metals Fabricated by Infiltration", M. Gasik, V. Jaervelae, K. Lilius & S. Stroemberg, *Proceeding of the 13th International Plansee Seminar*, Eds. H. Bildstein & M. Ede, *Metallwerk Plansee*, vol. 2 (1993), pp. 553–561 No month available.

"Processing of Functional–Gradient WC–Co Cermets by Powder Metallurgy", C. Colin, L. Durant, N. Favrot, J. Besson, G. Barbier, & F. Delannay, *International Journal of Refractory Metals & Hard Materials*, vol. 12, No. 3 (1993–1994), pp. 145–152 No month available.

SN 08/363172 Massa et al. Dec. 23, 1994.

SN 08/363467 Massa et al. Dec. 23,1994.

Roebuck, B., "Magnetic Moment (Saturation) Measurements on Hardmetals,"NPL National Physical Laboratory, Teddington, Middlesex TW11 OLW, United Kingdom Dec. 1994, pp. 1–12.

Viswanadham, R. K., "Stability of Microstructural Discontinuities in Cemented Carbides," Intl. Journal of Powder Metallurgy, Oct. 1987, USA, vol. 23, No. 4, ISSN 0361–3488, pp. 229–235.

Richter, V., "Fabrication and Properties of Gradient Hard Metals," 3rd Intl. Symposium on Structural Gradient Materials, Proceedings of FGM '94, Lausanne, Switzerland, 10–12 Oct. 1994, 1995, Lausanne, Switzerland, Presses Polytech. Univ., Romandes, Switzerland.

Almond et al., "Identification of Optimum Binder Phase Compositions for Improved WC Hard Metals," Materials Science & Engineering, vol. A105/106, Nov. 1988, pp. 237–248, XP 000569230.

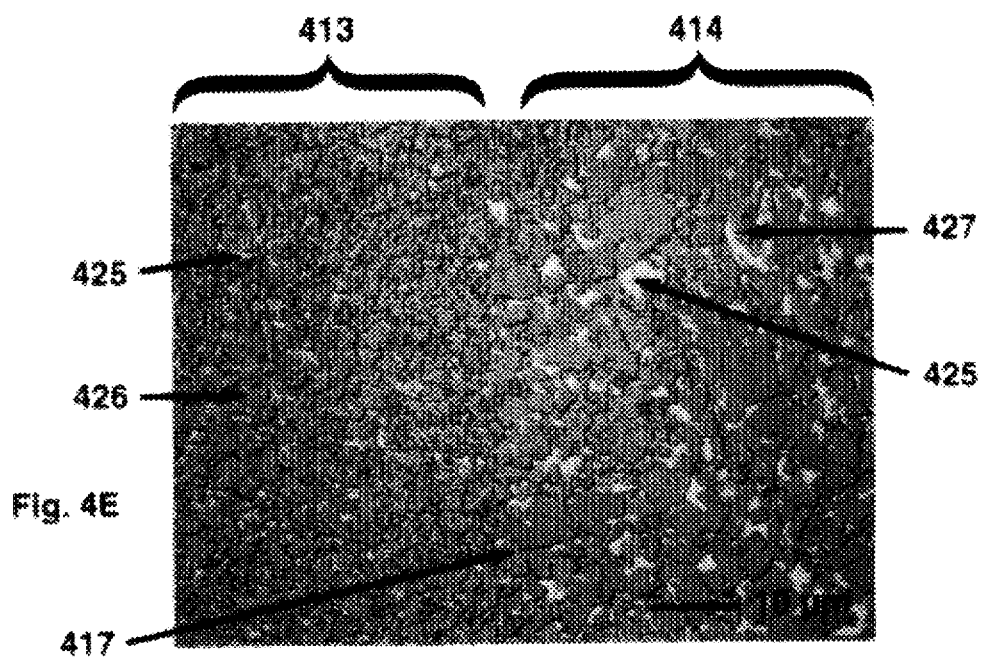
Fig. 4E
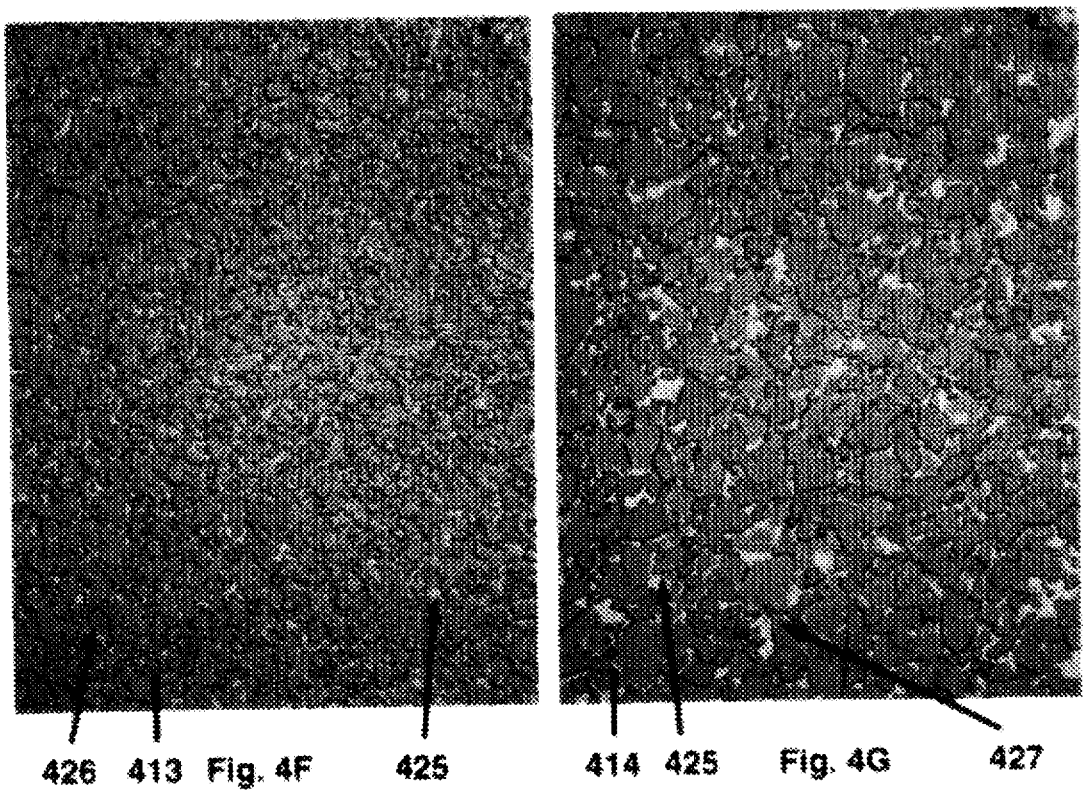
Fig. 4F
Fig. 4G

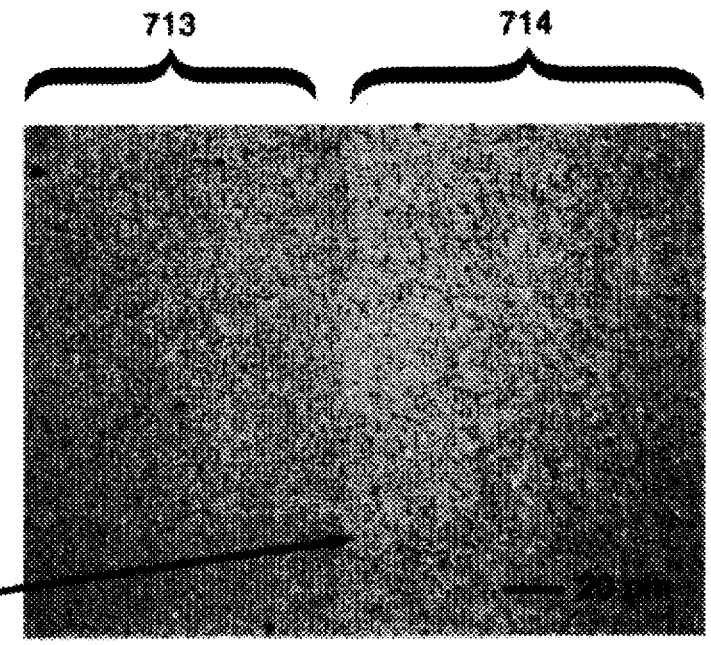
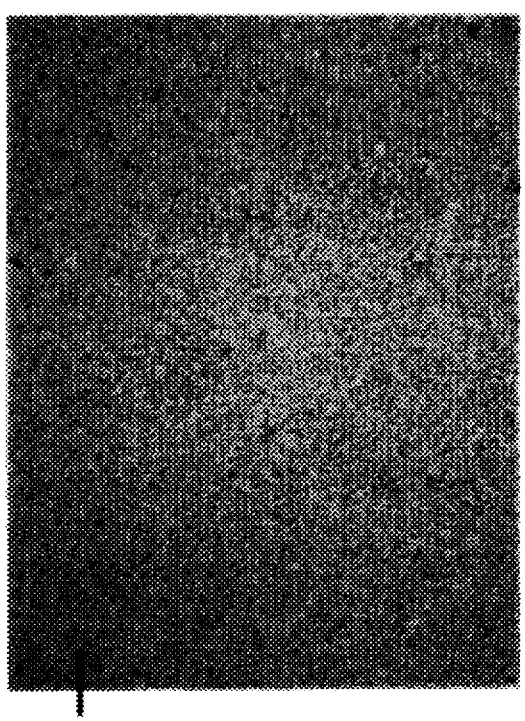
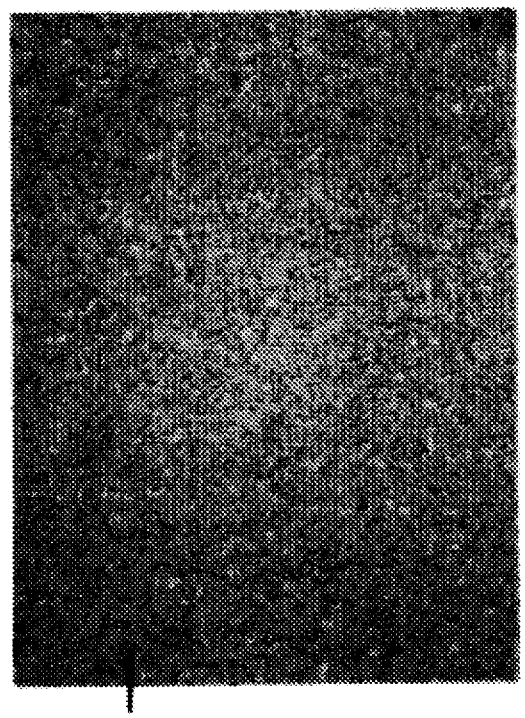
Fig. 7A
Fig. 7B
Fig. 7C

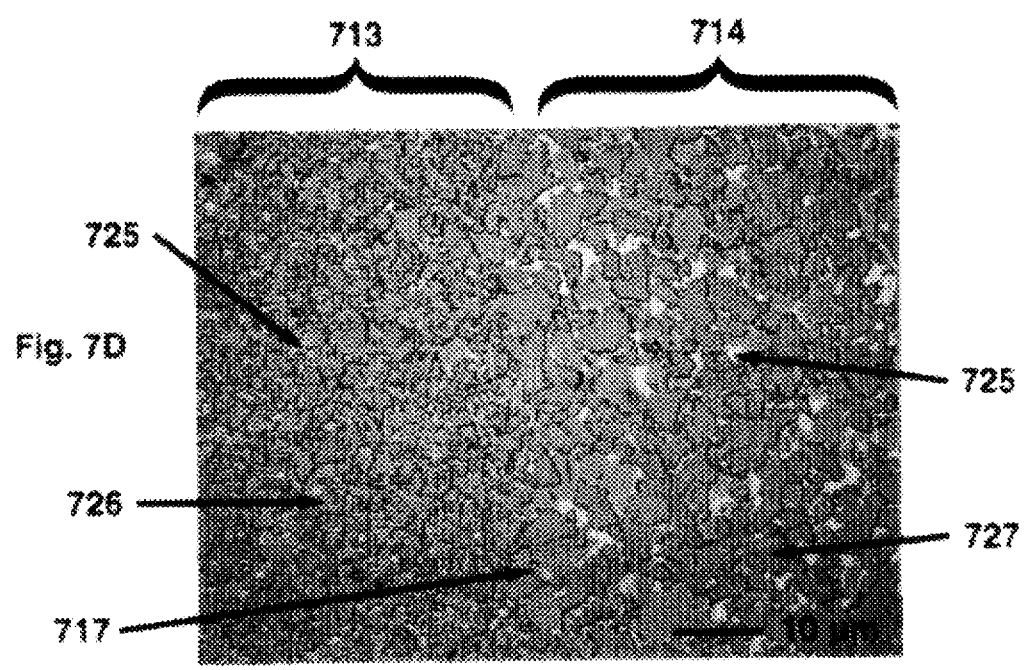
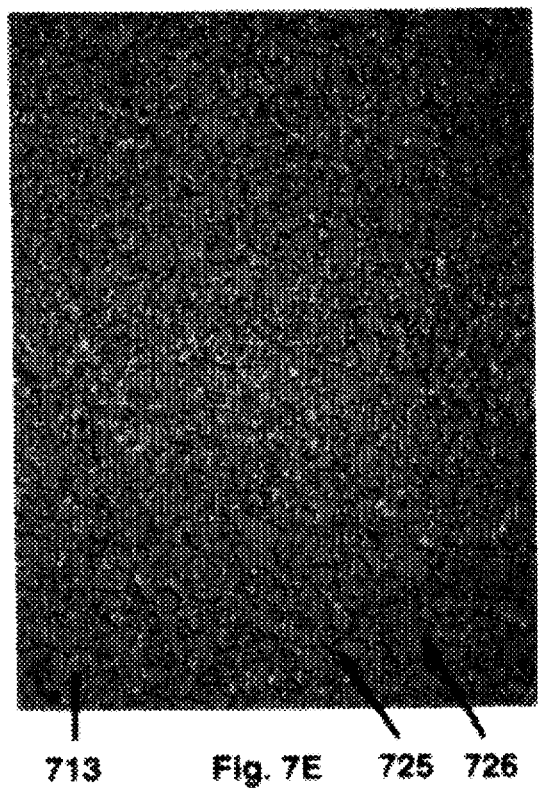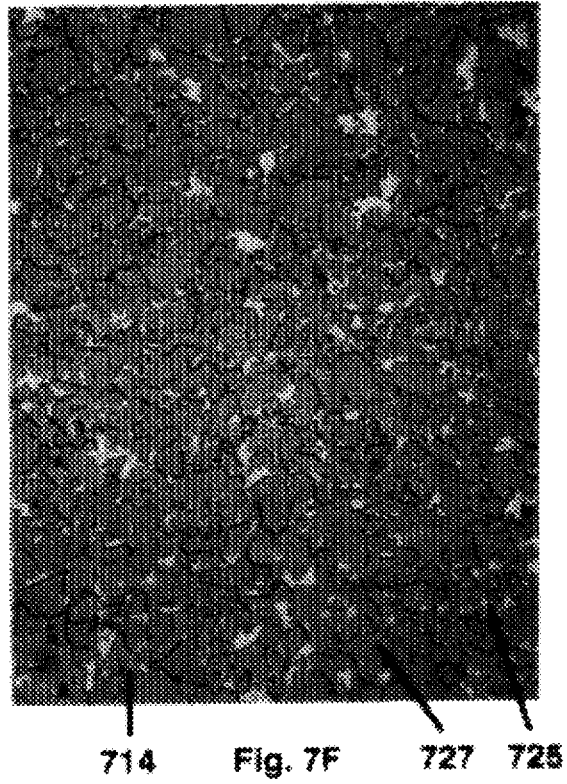

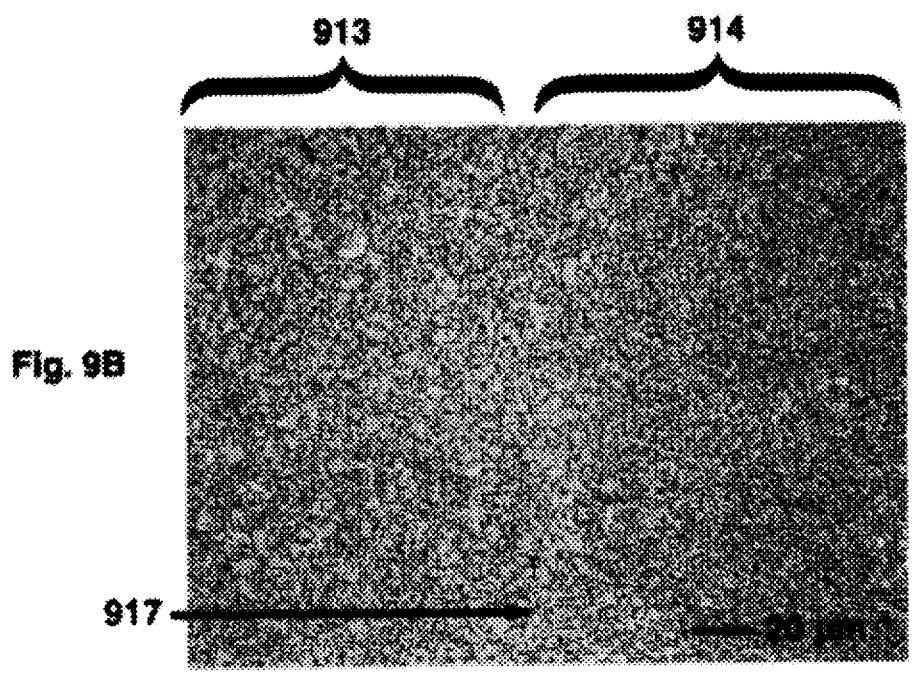
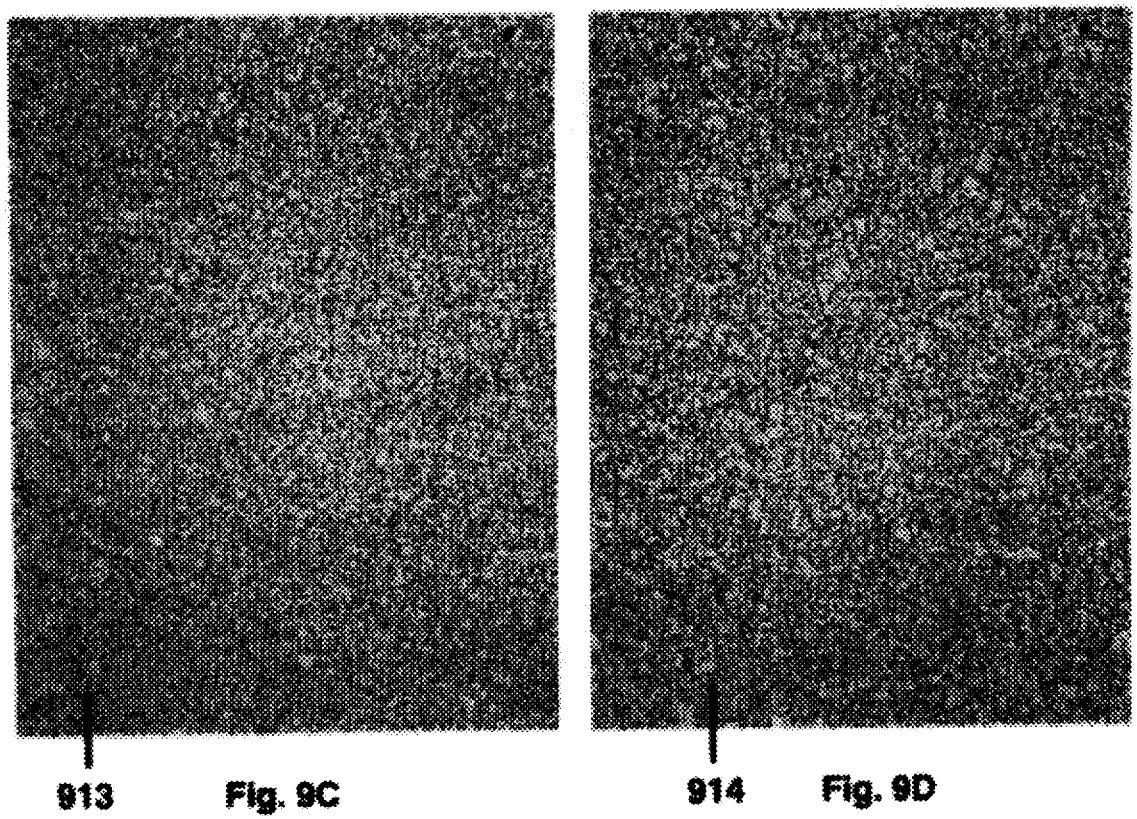

COMPOSITE CERMET ARTICLES AND METHOD OF MAKING

This is a divisional of application Ser. No. 08/363,147 filed on Dec. 23, 1994, now U.S. Pat. No. 5,541,006.

BACKGROUND

Cermet is a term used to describe a monolithic material composed of a hard component and a binder component. The hard component comprises a nonmetallic compound or a metalloid. The hard component may or may not be interconnected in two or three dimensions. The binder component comprises a metal or alloy and is generally interconnected in three dimensions. The binder component cements the hard component together to form the monolithic material. Each monolithic cermet's properties are derived from the interplay of the characteristics of the hard component and the characteristics of the binder component. For example, if the hard component or the binder component exhibits ferromagnetic characteristics so might the monolithic cermet.

A cermet family may be defined as a monolithic cermet consisting of a specified hard component combined with a specified binder component. Tungsten carbide cemented together by a cobalt alloy is an example of a family (WC—Co family, a cemented carbide). The properties of a cermet family may be tailored, for example, by adjusting an amount, a characteristic feature, or an amount and a characteristic feature of each component separately or together. However, an improvement of one material property invariably decreases another. When, for example, in the WC—Co family as resistance to wear is improved, the resistance to breakage generally decreases. Thus, in the design of monolithic cemented carbides there is a never ending cycle that includes the improvement of one material property at the expense of another.

Despite this, monolithic cemented carbides are used in equipment subject to aggressive wear, impact, or both. However, rather than build the entire equipment from monolithic cemented carbides, only selected portions of the equipment comprise the monolithic cemented carbide. These portions experience the aggressive wear, impact, or both. In some equipment the cemented carbide portion has a specified profile that should be sustained to maintain the maximum efficiency of the equipment. As the specified profile changes, the equipment's efficiency decreases. If the equipment is used for cutting a work piece, the amount removed from the work piece decreases as the profile of the cemented carbide deviates from the specified profile.

For example, as the specified dome-shaped profiles of cemented carbide compacts used in conjunction with a percussive bit change, once optimally shaped cemented carbide compacts transform into flats by tangentially wearing away the domes. As flats gradually develop on the gage row, the cut hole diameter decreases. During the transformation from domes to flats, power supplied by a motor driving the percussive bit may be increased thereby increasing the rate of wear. One solution to the loss of a specified profile includes removing the equipment from use and reprofiling the cemented carbide—this is costly due to the time required to withdraw the percussive bit from a hole (up to several hundred meters (feet) deep) and the loss of productive use of the equipment during reprofiling. Another solution involves scrapping the used cemented carbide portion and inserting a new cemented carbide—this too is costly, again, due to the time required to withdraw the percussive bit from, a hole (up to several hundred meters (feet) deep) and due to the loss of productive use of the equipment during refitting and the scrapped cemented carbide. Additional cost associated with this latter solution include reboring the undersized sections of the hole that developed as the domed cemented carbide transformed to flats. If these cemented carbides could be made to sustain their specified profiles for a longer time, for example, by increasing the wear resistance, economic and technical gains would result.

A solution to the endless cycle of adjusting one property of a monolithic cermet at the expense of another is to combine several monolithic cermets to form a multiple-region cermet article. The resources (i.e., both time and money) of many individuals and companies throughout the world have been directed to the development of multiple-region cemented carbide articles. The amount of resources directed to the development effort is demonstrated by the number of publications, U.S. and foreign patents, and foreign patent publications on the subject. Some of the many U.S. and foreign patents, and foreign patent publications include: U.S. Pat. Nos. 2,888,247; 3,909,895; 4,194,790; 4,359,355; 4,427,098; 4,722,405; 4,743,515; 4,820,482; 4,854,405; 5,074,623; 5,333,520; and 5,335,738, and foreign patent publication nos. DE-A-3 519 101; GB-A 806 406; EPA-0 111 600; DE-A-3 005 684; DE-A-3 519 738; FR-A-2 343 885; GB-A-1 115 908; GB-A-2 017 153; and EP-A-0 542 704. Despite the amount of resources dedicated, no satisfactory multipurpose multiple-region cemented carbide article is commercially available nor for that matter, currently exists. Further, there is no satisfactory method for making multiple-region cemented carbide articles. Furthermore, there are no satisfactory methods for making multiple-region cemented carbide articles that further exhibit improved wear resistance.

Some resources have been expended for "thought experiments" and merely present wishes—in that they fail to teach the methods of making such multiple-region cemented carbide articles.

Other resources have been spent developing complicated methods. Some methods included the pre-engineering of starting ingredients, green body geometry or both. For example, the starting ingredients used to make a multiple-region cemented carbide article are independently formed as distinct green bodies. Sometimes, the independently formed green bodies are also independently sintered and, sometimes after grinding, assembled, for example, by soldering, brazing or shrink fitting to form a multiple-region cemented carbide article. Other times, independently formed green bodies are assembled and then sintered. The different combinations of the same ingredients that comprise the independently formed green bodies respond to sintering differently. Each combination of ingredients shrinks uniquely. Each combination of ingredients responds uniquely to a sintering temperature, time, atmosphere, or any combination of the preceding. Only the complex pre-engineering of forming dies and, thus, green body dimensions allows assembly followed by sintering. To allow the pre-engineering, an extensive data base containing the ingredients response to different temperatures, times, atmospheres, or any combination of the preceding is required. The building and maintaining of such a data base are cost prohibitive. To avoid those costs, elaborate process control equipment might be used. This too is expensive. Further, when using elaborate process control equipment, minor deviations from prescribed processing parameters rather than yielding useful multiple-region cemented carbide articles—yield scrap.

Still other resources have been expended on laborious methods for forming multiple-region cemented carbide articles. For example, substoichiometric monolithic cemented carbide articles are initially sintered. Their compositions are deficient with respect to carbon and thus the cemented carbides contain eta-phase. The monolithic cemented carbide articles are then subjected to a carburizing environment that reacts to eliminate the eta-phase from a periphery of each article. These methods, in addition to the pre-engineering of the ingredients, require intermediate processing steps and carburizing equipment. Furthermore, the resultant multiple-region cemented carbide articles offer only minimal benefits since Once the carburized peripheral region wears away, their usefulness ceases.

For the foregoing reasons, there exists a need for multiple-region cermet articles and cemented carbide articles that can be inexpensively manufactured. Further, there exists a need for multiple-region cermet articles and cemented carbide articles that further exhibit superior wear resistance and can be inexpensively manufactured.

SUMMARY

The present invention relates to articles comprising cermets, preferably cemented carbides, having at least two regions exhibiting at least one different property. The present invention is further related to the methods of using these unique and novel articles. Also, the present invention relates to the methods of making these unique and novel articles. More particularly, the methods of the present invention relate to controlling the interaction of at least partially juxtaposed at least two powder blends so that upon densification the resultant regions exhibit properties that are related to the properties that each densified powder blend would exhibit as a single body.

The present invention satisfies a long-felt need in the cermet art for improved cermet material systems by providing articles having at least two regions having at least one property that differs and preferably having percentage magnetic saturations that differ. Such multiple-region articles are particularly useful when used in combination with steel fixturing to form tools for boring or drilling applications. An example includes cermet articles having at least one forward region that exhibits superior wear resistance and an adjacent or rearward region that exhibits superior strength or toughness or both. Another advantage of the combination of the at least two regions includes the enhanced support of the forward portion by supportingly extending the rearward portion into and with respect to the forward portion.

The present invention provides a method for making the present articles by recognizing the solution to the problems encountered in making multiple-region articles. Historically, attempts at making multiple-region articles failed due to the uncontrolled migration of binder between adjacent powder blends arising during the articles' densification. The articles of the present invention are manufactured by methods that exploit the synergy among processing parameters (e.g., differential hard component grain size or differential hard component chemistry or differential binder content or differential binder chemistry, densification temperature, densification time, densification atmosphere(s), densification pressure, or any combination of the preceding) to achieve unique and novel multiple-region articles. The methods include test sintering each powder blend, characterizing the test sintered cermet's properties, and, if appropriate, adjusting the powder blend chemistry with appropriate additions. Particularly, the methods of the present invention are directed to cermets comprised of a hard component and a ferromagnetic component. After test sintering, the magnetic properties(e.g., coercive force (Hc) and magnetic saturation (MS)), chemistry or mineralogical constituents of the test sintered cermets are determined. These data are used to adjust the chemistry of each powder blend by adding a source or sources of constituents of the hard component, the binder or both, if required, to control binder migration among juxtaposed powder blends during densification. Further, after any adjustments are made to each powder blend to tailor the magnetic saturation of each, the powder blends are juxtaposed at a temperature and a time just sufficient to substantially completely densify each, control binder migration, and autogeneously form a metallurgical bond between the resultant at least two regions. The magnetic saturation of each powder blend may be tailored to a value that corresponds to an appropriate liquidus temperature of the binder for each powder blend to effect the above. For example, in the tungsten carbide cobalt system the magnetic saturation of each powder blend is adjusted such that full densification of each powder blend occurs, the binder migration among each powder blends is controlled and, preferably, such that the densification temperature and densification time are minimized.

The unique and novel articles of the present invention comprise at least two regions, and may comprise multiple-regions. A first region comprises a first hard component, preferably carbide(s), and a first prescribed binder content. A second region of the article, juxtaposing or adjoining the first region, comprises a second hard component, preferably carbide(s), and a second prescribed binder content. The binder content of the first region and the second region may differ. The first region of the present articles may be more wear resistant than the second region. The articles may have extended useful lives relative to the useful life of prior art articles in such applications as, for example, wear.

In an embodiment of the present invention, at least one property of each of the at least two regions is tailored by varying the hard component grain size or the hard component chemistry or the binder content or the binder chemistry or any combination of the preceding. The at least one property may include any of density, color, appearance, reactivity, electrical conductivity, strength, fracture toughness, elastic modulus, shear modulus, hardness, thermal conductivity, coefficient of thermal expansion, specific heat, magnetic susceptibility, coefficient of friction, wear resistance, impact resistance, chemical resistance, etc., or any combination of the preceding.

In an embodiment of the present invention, the amount of the at least two regions may be varied. For example, the thickness of the first region relative to the thickness of the second region may vary from the first region comprising a coating on the second region to the second region comprising a coating on the first region. Naturally, the first region and second region may exist in substantially equal proportions.

In an embodiment of the present invention, the juxtaposition of the first region and the second region may exist as a planar interface or a curved interface or a complex interface or any combination of the preceding. Furthermore, the first region may either envelop or be enveloped by the second region.

In an embodiment of this invention, the articles of the invention may be used for materials manipulation or removal including, for example, mining, construction, agricultural, and machining applications. Some examples of agricultural applications include seed boots (see e.g., U.S. Pat. No. 5,325,799), inserts for agricultural tools (see e.g., U.S. Pat. Nos. 5,314,029 and 5,310,009), disc blades (see e.g., U.S. Pat. No. 5,297,634), stump cutters or grinders (see e.g., U.S. Pat. Nos. 5,005,622; 4,998,574; and 4,214,617), furrowing tools (see e.g., U.S. Pat. Nos. 4,360,068 and 4,216,832), and earth working tools (see e.g., U.S. Pat. Nos. 4,859,543; 4,326,592; and U.S. Pat. No. 3,934,654). Some examples of mining and construction applications include cutting or digging tools (see e.g., U.S. Pat. Nos. 5,324,098; 5,261,499; 5,219,209; 5,141,289; 5,131,481; 5,112,411; 5,067,262; 4,981,328; and 4,316,636), earth augers (see e.g., U.S. Pat. Nos. 5,143,163 and 4,917,196), mineral or rock drills (see e.g., U.S. Pat. Nos. 5,184,689; 5,172,775; 4,716, 976; 4,603,751; 4,550,791; 4,549,615; 4,324,368; and 3,763,941), construction equipment blades (see e.g., U.S. Pat. Nos. 4,770,253; 4,715,450; and 3,888,027), rolling cutters (see e.g., U.S. Pat. Nos. 3,804,425 and 3,734,213), earth working tools (see e.g., U.S. Pat. Nos. 4,859,543; 4,542,943; and 4,194,791), comminution machines (see e.g., U.S. Pat. Nos., 4,177,956 and 3,995,782), excavation tools (see e.g., U.S. Pat. Nos. 4,346,934; 4,069,880; and 3,558, 671), and other mining or construction tools (see e.g., U.S. Pat. Nos. 5,226,489; 5,184,925; 5,131,724; 4,821,819; 4,817,743; 4,674,802; 4,371,210; 4,361,197; 4,335,794; 4,083,605; 4,005,906; and 3,797,592). Some examples of machining applications included materials cutting inserts (see e.g., U.S. Pat. Nos. 4,946,319; 4,685,844; 4,610,931; 4,340,324; 4,318,643; 4,297,050; 4,259,033; and 2,201,979 (RE 30,908)), materials cutting inserts incorporating chip control features (see e.g., U.S. Pat. Nos. 5,141,367; 5,122, 017; 5,166,167; 50,032,050; 4,993,893; 4,963,060; 4,957, 396; 4,854,784; and 4,834,592), and materials cutting inserts comprising coating applied by any of chemical vapor deposition (CVD), physical vapor deposition (PVD), conversion coating, etc. (see e.g., U.S. Pat. Nos. 5,325,747; 5,266,388; 5,250,367; 5,232,318; 5,188,489; 5,075,181; 4,984,940; and 4,610,931 (RE 34,180)). The subject matter of all of the above patents relating to applications is incorporated by reference in the present application. Particularly, the articles may be used in wear applications where an article comprising, for example, a pre-selected geometry with a forward portion manipulates or removes materials (e.g., rock, wood, ore, coal, earth, road surfaces, synthetic materials, metals, alloys, composite materials (ceramic matrix composites-(CMCs), metal matrix composites (MMCs), and polymer or plastic matrix composites (PMCs) ), polymers, etc.). More particularly, the articles may be used in applications where it is desirable to maintain a working portion or a contacting portion or both of an article incorporated within a tool to extend the life of the tool.

An embodiment of the present invention relates to the novel method of making the present novel and unique articles. That is, at least a first powder blend and a second powder blend are arranged in a prescribed manner, for example, to form a green body. If the shape of the green body does not correspond substantially to the shape of the final article, then the green body may be formed into a desired shape, for example, by green machining or plastically deforming or sculpting the green body or by any other means. The green body, whether or not shaped, may then be densified to form a cermet, preferably a cemented carbide article and more preferably a tungsten carbide-cobalt article. If the densified article has not been pre-shaped or when additional shaping is desired, the densified article may be subjected to grinding or other machining operations.

In an embodiment of the present invention, the constituents of a first powder blend and a second powder blend may be selected such that the resultant article exhibits the characteristic discussed above. For example, the nominal chemistry of the first powder blend and the nominal chemistry of the second powder blend are prescribed so that the densification temperature, densification time, or both of the at least two powder blends are minimized and are common to each powder blend. Furthermore, during densification, there is a controlled migration of the binder between the at least two powder blends. Additionally, the binder content of a first powder blend and a second blend may be substantially different. Furthermore, the percentage magnetic saturation of the resultant regions of an article are adjusted by varying the binder chemistry or the hard component chemistry, preferably carbide(s) chemistry, or both. Methods for adjusting the percentage magnetic saturation include adding sources of constituents of the hard component to a powder blend. The percentage magnetic saturation may be substantially the same, substantially different or vary continuously between the at least two powder blends.

The control of binder migration among at least two juxtaposed powder blends by magnetic saturation measurement is unique and novel. Traditionally, cemented carbide compositions were controlled by measuring the hardness of a test sample of sintered cemented carbide. If the measured hardness was within specified hardness range, it was concluded that cemented carbide's chemistry was acceptable. However, this may be deceptive since the magnetic saturation for a group of samples may range from the minimum possible value to the maximum possible value even though each sample in the group has same measured hardness. Likewise, the measured hardness for a group of samples may range from the minimum possible value to the maximum possible value even though each sample in the group has the same magnetic saturation. Quite simply, traditional hardness measurement methods fail to provide the refined correlation between a carbide's chemistry and the measured result available with magnetic saturation measurements.

However, not only does magnetic saturation measurement provide a means for refined cemented carbide chemistry control, but more importantly magnetic saturation measurement provides the means for facilitating the formation of multiple-region cermets. These means, when combined with densification conditions (i.e., temperatures, pressures, times, or any combination of the proceeding), may be used to produce a substantially theoretically dense multiple-region cermet article having minimal porosity and uniform levels of the binder throughout the respective regions right up to the interface among the respective regions. The ability to control the formation of substantially uniform regions in a multiple-region article with abrupt or discrete compositional changes at the interface among regions is a very significant contribution of the present invention. More specifically, the temperatures, pressures, times, or any combination of the proceeding are prescribed to coincide with percentage magnetic saturations, which are tailored for each powder blend, that control binder migration during densification. In a preferred embodiment relating to the tungsten carbide-cobalt, after the percentage magnetic saturation of each powder blend has been tailored, the densification time and densification temperature of each powder blend coincide and are concertedly minimized such that full densification of each powder blend occurs while binder migration is controlled.

BRIEF DESCRIPTION OF THE DRAWINGS

FIG. 4E, 4F and 4G are respectively photomicrographs taken at a magnification of about 1,500× of an interface 417 between a first region 413 and a second region. 414, a first region 413, and a second region 414 of an article made according to the methods of Example 1.

FIGS. 7A, 7B, and 7C are respectively photomicrographs taken at a magnification of about 500× of an interface 717 between a first region 713 and a second region 714, a first region 713, and a second region 714 of an article made according to the methods of Example 2.

FIG. 7D, 7E, and 7F are respectively photomicrographs taken at a magnification of about 1,500× of an interface 717 between a first region 713 and a second region 714, a first region 713, and a second region 714 of an article made according to the methods of Example 2.

FIGS. 9B, 9C, and 9D are respectively photomicrographs taken at a magnification of about 500× of an interface 917 between a first region 913 and a second region 914, a first region 913, and a second region 914 of an article made according to the methods of Example 3.

DETAILED DESCRIPTION

Articles of the present invention are described with reference to a hypothetical article 101 depicted in FIG. 1. Line A—A in FIG. 1 may represent, for example, a boundary or surface of an article, a plane of mirror symmetry, an axis of cylindrical or rotational symmetry, etc. In the following discussion, it is assumed that line A—A is an axis of cylindrical or rotational symmetry. It will be apparent to an artisan skilled in the art that the following discussion may be extended to articles having complex geometry. Thus, the following discussion should not be construed as limiting but, rather, as a starting point.

Figure 1:
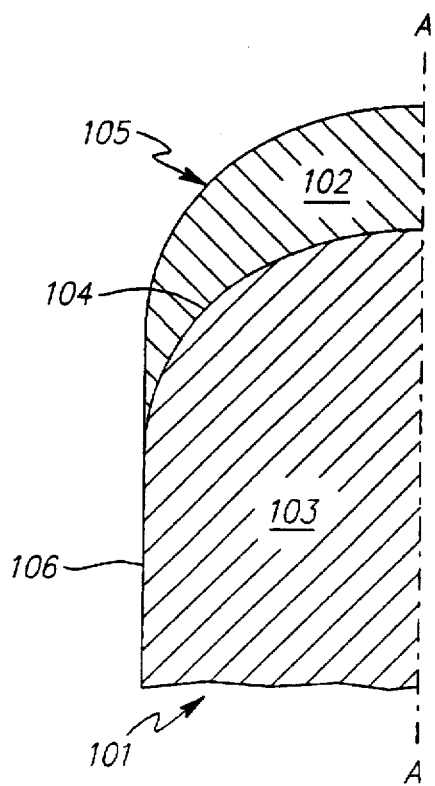
FIG. 1 is a cross-sectional schematic of a general article. 101 comprising a first region 102 and a second or an at least one additional region 103.
Figure 2A:
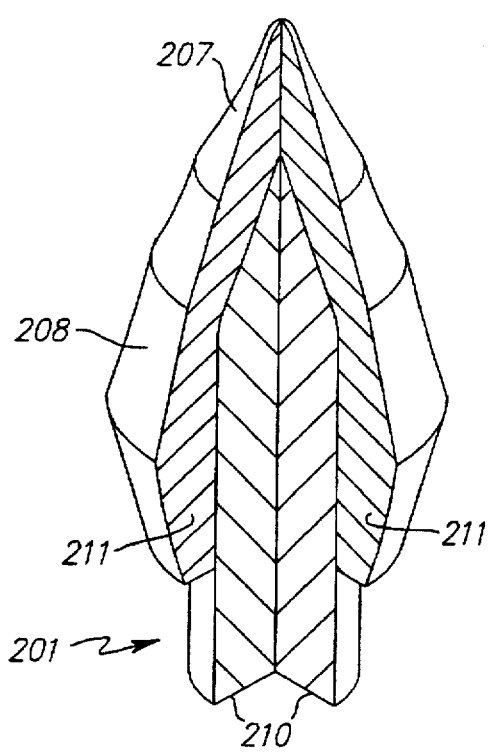
FIG. 2A, 2B, 2C, 2D, 2E, and 2F are examples of schematic cut away views of possible geometries of articles or portions of articles encompassed by the present invention.
Figure 2B:
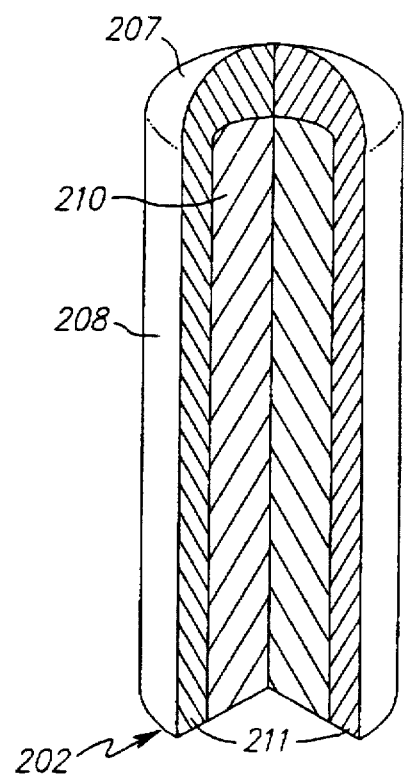
Figure 2C:
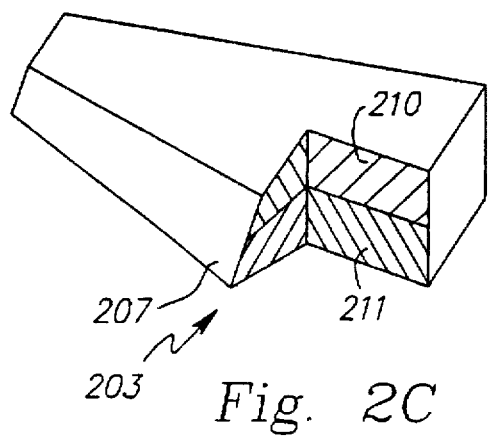
Figure 2D:
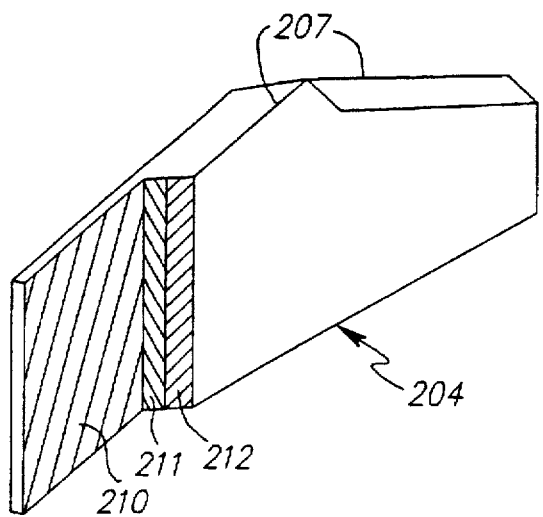
Figure 2F:
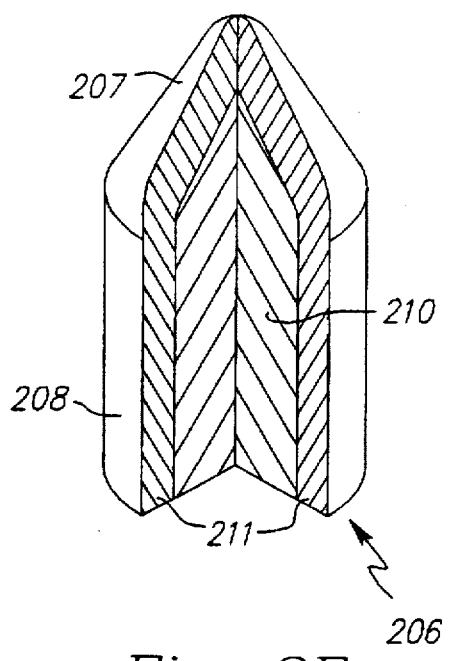
Figure 2E:
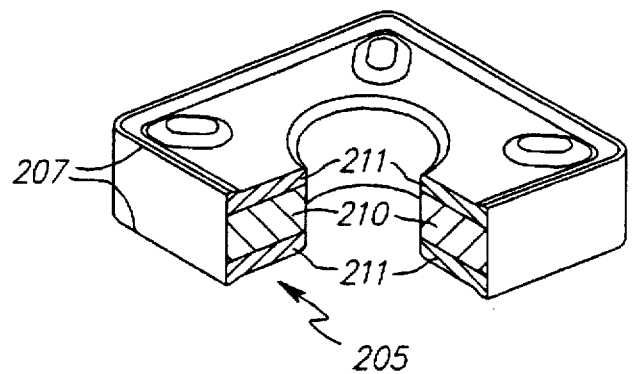

In reference to FIG. 1, article 101 has a first region 102 adjoining and integral with a second or at least one additional region 103. It will be understood by an artisan skilled in the art that multiple regions may be included in an article of the present invention. Interface 104 defines the boundary of the adjoining at least two regions. In a preferred embodiment, interface 104 is autogeneously formed. Article 101 may further comprise a leading surface 105 defined by at least a portion of the material of the first region 102 and a recessed surface 106 defined by at least a portion of the material of the second or at least one additional region 103.

Compositionally, the materials comprising the at least two regions comprise cermets. Each cermet comprises a hard component and a binder. Such hard component may comprise at least one of boride(s), carbide(s), nitride(s), oxide(s), silicide(s), their mixtures, their solutions or any combination of the proceeding. The metal of the at least one boride(s), carbide(s), nitride(s), oxide(s), or silicide(s) include one or more metals from International Union of Pure and Applied Chemistry (IUPAC) groups 2, 3, 4, 5, 6, 7, 8, 9, 10, 11, 12, 13 and 14. Preferably, the hard component comprises carbide(s), their mixtures, their solutions or any combination of the proceeding. The metal of carbide(s) comprises one or more metals from IUPAC groups 3 (including the lanthanides and actinides), 4, 5, and 6; more preferably one or more of Ti, Zr, Hf, V, Nb, Ta, Cr, Mo and W; and even more preferably, tungsten.

The binder for the at least two regions comprise metals, glasses or ceramics (i.e., any material that forms or assists in forming a liquid phase during liquid phase sintering and that are ferromagnetic). Preferably, the binder comprises one or more metals from IUPAC groups 8, 9 and 10; preferably, one or more of iron, nickel, cobalt, their mixtures, their alloys, and any combination of the preceding; and more preferably, cobalt or cobalt alloys such as cobalt-tungsten alloys. Binders comprise single metals, mixtures of metals, alloys of metals or any combination of the preceding.

Dimensionally, the grain size of the hard component, preferably carbide(s), of the at least two regions may range in size from submicrometer to about 420 micrometers or greater. Submicrometer includes ultrafine structured and nanostructured materials. Nanostructured materials have structural features ranging from about 1 nanometer to about 300 nanometers or more. The average grain size of the hard component, preferably carbide(s), in the first region may be greater than, less than, or equal to the average grain size of the hard component, preferably carbide(s), in the second region.

In a preferred embodiment, the grain size of the hard component, preferably carbide(s) and more preferably, tungsten carbides, of the first region ranges from about submicrometer to about 30 micrometers or greater with possibly a scattering of grain sizes measuring, generally, in the order of about 40 micrometers. Preferably, the grain size of the hard component of the first region ranges from about one micrometer to about 30 micrometers or greater with possibly a scattering of grain sizes measuring, generally, in the order of about 40 micrometers, while the average grain size ranges from about submicrometer to about 12 micrometers; preferably, from about 1 micrometer to about 8 micrometers; and more preferably, from about 1 micrometers to about 5 micrometers. Likewise, the grain size of the hard component of the second region ranges from about submicrometer to 30 micrometers or greater with possibly a scattering of grain sizes measuring, generally, in the order of about 40 micrometers. Preferably, the grain size of the hard component of the second region ranges from about one micrometer to about 30 micrometers or greater with possibly a scattering of grain sizes measuring, generally, in the order of about 40 micrometers, while the average grain size ranges from about submicrometer to about 20 micrometers; preferably, from about 1 micrometer to about 12 micrometers; and more preferably, from about 3 micrometers to about 10 micrometers.

In general, the hard component grain size and the binder content may be correlated to the mean free path of the binder by quantitative metallographic techniques such as those described in "Metallography, Principles and Practice" by George F. Vander Voort (published in 1984 by McGraw Hill Book Company, New York, N.Y.). Other methods for determining the hard component grain size included visual comparison and classification techniques such as those discussed in ASTM designation: B 390–92 entitled "Standard Practice for Evaluating Apparent Grain Size and Distribution of Cemented Tungsten Carbide," approved January 1992 by the American Society For Testing and Materials, Philadelphia, Pa. The results of these methods provide apparent grain size and apparent grain size distributions.

In a preferred embodiment, the binder content of the first region comprises, by weight, from about one percent and below to about 30 percent or more; preferably, from about 1 percent to about 15 percent; more preferably, from about 2 percent to about 10 percent; and even more preferably, from about 3 percent to about 6 percent. Likewise, the binder content of the second region or at least one additional region ranges, by weight, from about 2 percent and below to about 30 percent or more; preferably, from about 2 percent to about 20 percent; and more preferably, from about 4 percent to about 15 percent; and even more preferably, from about 6 percent to about 10 percent. The binder content of the second region may be greater than that of the first region and in a preferred embodiment is greater.

The solid geometric shape of an article may be simple or complex or combinations of both. Solid geometric shapes include cubic, parallelepiped, pyramidal, frustum of a pyramid, cylinder, hollow cylinder, cone, frustum of a cone, sphere (including zones, segments and sectors of a sphere and a sphere with cylindrical or conical bores), torus, sliced cylinder, ungula, barrel, prismoid, ellipsoid and combinations thereof. Likewise, cross-sections of such articles may be simple or complex or combinations of both. Such shapes may include polygons (e.g., squares, rectangles, parallelograms, trapezium, triangles, pentagons, hexagons, etc.), circles, annuli, ellipses and combinations thereof. FIGS. 2A, 2B, 2C, 2D, 2E and 2F illustrate combinations of a first region 210, a second region 211 and in some case a third region 212 (FIG. 2D) incorporated in various solid geometries. These figures are cut-away sections of the articles or portions of articles (conical cap or conical hybrid or scarifier conical in FIG. 2A; compact in FIG. 2B; grader or scraper or plow blade in FIG. 2C; roof bit insert in FIG. 2D; cutting insert for chip forming machining of materials in FIG. 2E; and conical plug or insert in 2F) and further demonstrate a leading edge or surface 207, and an outer surface 208.

Again, with reference to FIG. 1, the interface 104 defining the boundary between the first region 102 and the second region 103 may divide the article 101 in a symmetric manner or an asymmetric manner or may only partially divide the article 101. In this manner, the ratios of the volume of the first region 102 and the at least one additional region 103 may be varied to engineer the most optimum bulk properties for the article 101.

The novel articles of the present invention are formed by providing a first powder blend and at least one additional powder blend or a second powder blend. It will be apparent to an artisan skilled in the art that multiple powder blends may be provided. Each powder blend comprises at least one hard component, at least one binder, preferably at least one lube (an organic or inorganic material that facilitates the consolidation or agglomeration of the at least one hard component and at least one binder), and optionally, at least one surfactant. The composition of the hard component of each powder may be the same or different and includes any and all of those discussed or precursor to those discussed above in regard to the composition of the materials comprising the at least two regions of an article. In a preferred embodiment relating to carbide(s), particularly tungsten carbide(s), the carbide(s) is(are) formed by either a thermit reaction, as that described in U.S. Pat. Nos. 3,379,503, and 4,834,963, or a reduction of ores(e.g., either wolframite or scheelite for tungsten) to metal and then carburizing the metal to carbide(s) by combining it with a carbon source and heating. Likewise, the binder of each powder may be the same or different and includes any and all of those discussed or precursor to those discussed above in regard to the binder for the at least two regions of an article.

Methods for preparing each powder blend include milling with rods or cycloids followed by mixing and then drying in a sigma-blade type dryer or spray dryer. In any case, each powder blend is prepared by a means that is compatible with the consolidation means, densification means, or both when both are employed.

A first powder blend having a pre-selected hard component, preferably carbide(s), grain size or grain size distribution and at least one additional powder blend having a coarser hard component, preferably carbide(s), grain size or grain size distribution are provided. The at least two powder blends are at least partially juxtaposed. The at least partial juxtaposition provides or facilitates the formation of the novel articles having at least two regions having at least one different property after consolidation and densification by, for example, sintering.

A first powder blend comprises a hard component, preferably carbide(s), having a fine particle size relative to the at least one additional powder blend. Particle sizes may range from about submicrometer (Submicrometer includes ultrafine structured and nanostructured materials. Nanostructured materials have structural features ranging from about one nanometer to about 100 nanometers or more.) to about 420 micrometers or greater; preferably, grain sizes range from about submicrometer to about 30 micrometers or greater with possibly a scattering of particle sizes measuring, generally, in the order of about 40 micrometers. In this preferred particle size, the average particle size may range from about submicrometer to about 12 micrometers; preferably, from about 1 micrometer to about 8 micrometers; and more preferably, from about 1 micrometer to about 5 micrometers.

A binder amount of a first powder blend is pre-selected to tailor the properties, for example, to provide sufficient wear resistance of the resultant first region of an article for its intended use. The pre-selected binder content may range, by weight, from about one percent and less to about 30 percent or more; preferably, from about 1 percent to about 15 percent; more preferably, from about 2 percent to about 8 percent; and even more preferably, from about 2 percent to about 4 percent.

A binder particle size of each powder blend may be any size that facilitates the formation of an article of the present invention. Suitable sizes have an average particle size less than about 5 micrometers; preferably, less than about 2.5 micrometers; and more preferably, less than about 1.8 micrometers.

The average particle size of the hard component in the second powder blend may be greater than the average particle size of the hard component of the first powder blend and in a preferred embodiment is. As with the first powder blend, the particle size of the hard component, preferably carbide(s), may range from about submicrometer to about 420 micrometers or greater. Submicrometer includes ultrafine structured and nanostructured materials. Nanostructured materials ranging from about 1 nanometer to about 100 nanometers or more. Preferred particle sizes range from about submicrometer to about 30 micrometers, with possibly a scattering of particle sizes measuring, generally, in the order of about 40 micrometers. Unlike the first powder blend, the average particle size of the hard component, preferably carbide(s), may range from about 1 to about 20 micrometers; preferably, from about 1 micrometer to about 12 micrometers; and more preferably, from about 3 to about 10 micrometers.

The binder content of each powder blend is selected to both facilitate formation of an article and provide optimum properties to the article for its particular application. Thus, the binder content of the first powder blend may be less than or equal to the binder content of the second powder blend. Thus, the binder content of the second powder blend ranges, by weight, from about zero (0) to about 14 percentage points different from the percentage of the preselected binder content of the first powder blend; preferably, about 9; more preferably, about 6; and even more preferably, about 4 percentage points different from the percentage of the preselected binder content of the first powder blend. In a preferred embodiment, the binder content of the first powder blend is less than that of the second powder blend. For example, if the preselected binder content of the first powder blend is by weight, about 6 percent, then the binder content of the second powder blend might be about 20, preferably about 15 percent, more preferably about 12 percent and even more preferably about 10 percent.

The percentage magnetic saturation of each powder blend is tailored to both facilitate formation of a multiple-region article and provide optimum properties to the article for its particular application. The percentage magnetic saturation of a test sintered specimen of the first powder blend may be greater or less than the percentage magnetic saturation of the second powder blend. Thus, the percentage magnetic saturation of a test sintered specimen of each powder blend may range from a minimum value for the binder to a maximum value for a binder which may be 100. In a preferred embodiment, the percentage magnetic saturation of a test sintered specimen of the first powder blend is greater than that of a test sintered specimen of the second powder blend.

The magnetic saturation of unalloyed cobalt is about 160 centimeter 3/gram (17,870 gauss; 1.787 tesla 2019 gauss centimeter 3/gram; 201.9 microtesla meter 3/kilogram; or 16.1 microtesla meter 3/kilogram) or 100 when expressed as percentage magnetic saturation. Carbon is substantially insoluble in cobalt while tungsten is soluble, by weight, up to about 20 percent. A correlation of the magnetic saturation to the concentration of tungsten dissolved in the cobalt ranges between the precipitation of etaphase because the tungsten-carbon-cobalt system is carbon deficient and the precipitation of carbon, also called "C" porosity, because the tungsten-carbon-cobalt system is carbon rich. In this range the percentage magnetic saturation ranges from about 79 to about 100. Thus, in the tungsten carbide-cobalt system the percentage magnetic saturation of a test sintered specimen of each powder blend may range from the minimum value of about 79 to the maximum value of about 100. In a preferred embodiment relating to the tungsten carbide-cobalt system the percentage magnetic saturation of a test sintered specimen of a powder blend having a high binder content may be less than the percentage magnetic saturation of a test sintered specimen of a powder blend having a binder content less than the high binder content.

The at least two powder blends are provided in any means that allows at least a portion of each to be at least partially juxtaposed. Such means may include, for example, pouring; injection molding; extrusion, either simultaneous or sequential extrusion; tape casting; slurry casting; slip casting; sequential compaction; co-compaction; or any combination of the preceding. Some of these methods are discussed in U.S. Pat. Nos. 4,491,559; 4,249,955; 3,888,662; and 3,850,368, which are incorporated by reference in their entirety in the present application.

During the formation of a green body, the at least two powder blends may be maintained at least partially segregated by a providing means or by a segregation means or both. Examples of providing means may include, for example, the methods discussed above while segregation means may include a physically removable partition or a chemically removable partition or both.

A physically removable partition may be a thin barrier as simple as a paper or other material that is placed into a die or mold during the charging of the at least two powder blends and which is removed from the die or mold after powder blend charging and prior to powder blend densification. More sophisticated physically removable partitions may include concentric or eccentric tubes (e.g., impervious or pervious sheets, screens or meshes, whether metallic or ceramic or polymeric or natural material, or any combination of the preceding). The shapes of physically removable partitions may be any that facilitate the segregation of the at least two powder blends.

A chemically removable partition includes any partition, whether in a simple or complex form or both, or pervious or impervious or combinations of both, that may be removed from or consumed by the segregated at least two powder blends by a chemical means. Such means may include leaching or pyrolysis or fugitive materials or alloying or any combination of the preceding. Chemically removable partitions facilitate the formation of articles of the present invention wherein the at least two regions, cross-sectionally as well as in regard to the solid geometry, comprise complex shapes.

In an embodiment of the present invention, the segregated and at least partially juxtaposed at least two powder blends are consolidated, densified, or both by, for example, pressing including, for example, uniaxial, biaxial, triaxial, hydrostatic, or wet bag either at room temperature or at elevated temperature (e.g., hot pressing).

In any case, whether or not consolidated, the solid geometry of the segregated and at least partially juxtaposed at least two powder blends may include all those enumerated earlier in the discussion relating to the solid geometry of an article. To achieve the direct shape or combinations of shapes, the segregated and at least partially juxtaposed at least two powder blends may be formed prior to or after densification or both. Prior forming techniques may include any of the above mentioned providing means as well as green machining or plastically deforming the green body or their combinations. Forming after densification may include grinding or any machining operations.

The cross-sectional profile of a green body may be simple or complex or combinations of both. Shapes likewise include all those enumerated earlier in the discussion relating to the cross-sections of articles.

The green body comprising the segregated and at least partially juxtaposed at least two powder blends is then densified by liquid phase sintering. Densification may include any means that is compatible with making an article of the present invention. Such means include vacuum sintering, pressure sintering, hot isostatic pressing (HIPping), etc. These means are performed at a temperature and/or pressure sufficient to produce a substantially theoretically dense article having minimal porosity. More specifically, the temperature and time are prescribed to coincide with percentage magnetic saturations, which in a preferred embodiment relating to the tungsten carbide-cobalt system are minimized for each powder blend, that control binder migration during densification. That is, after the percentage magnetic saturation of each powder blend has been tailored, and densification temperature of each powder blend coincide and the densification times are concertedly minimized.

For example, for tungsten carbide-cobalt articles, such temperatures may include temperatures ranging from about 1300° C. (2372° F.) to about 1650° C. (3002° F.). Densification pressures may range from about zero kPa (zero psi) to about 206,850 kPa (30,000 psi). For carbide articles, pressure sintering may be performed at from about 1,723 kPa (250 psi) to about 13,790 kPa (2000 psi) at temperatures from about 1370° C.(2498° F.) to about 1540° C.(2804° F.), while HIPping may be performed at from about 58,950 kPa (10,000 psi) to about 206,850 kPa (30,000 psi) at temperatures from about 1,310° C. (2390° F.)to about 1430° C.(2606° F.). Densification is a function of the densification time, the densification temperature, densification pressure, composition of each powder blend, percentage magnetic saturation of each powder blend, or any combination of the preceding. Preferably the densification time and the densification temperature are minimized to concertedly, with percentage magnetic saturation of each powder blend, control the migration of binder among each powder blend during densification while at the same time forming a substantially dense multiple-region article.

Densification may be done in the absence of an atmosphere, i.e., vacuum; or in an inert atmosphere, e.g., one or more gasses of IUPAC group 18; in nitrogenous atmospheres, e.g., nitrogen, forming gas (96% nitrogen, 4% hydrogen), ammonia, etc.; in a carburizing atmosphere; or in a reducing gas mixture, e.g., $H_2/H_2O$, $CO/CO_2$, $CO/H_2/CO_2/H_2O$, etc.; or any combination of the preceding.

In an effort to explain the workings of the present invention, but without wishing to be bound by any particular theory or explanation for the present invention, it appears as though the present invention is particularly applicable to systems that comprise a ferromagnetic binder and a nonferromagnetic hard component. The invention is also particularly applicable to the formation of multiple-region articles and might be summarized as follows. From knowledge of monolithic cermets one selects the binder content, the hard component chemistry and grain size or grain size distribution, and the relative amounts of the first region and the at least one additional region of an article for an application. One then proceeds to select each powder blend that has an appropriate hard component chemistry and particle size or particle size distribution. However and understanding that the binder may migrate during densification, one selects a first powder blend with a binder content less than that required for the first region of the multiple-region article and at least one additional powder blend with a binder content greater than that required for the at least one additional region of the multiple-region article. Each powder blend is then characterized by preparing, for example, a sintered test sample. At least the percentage magnetic saturation of each test sample is determined; however, the binder content, grain size or grain size distribution, or for that matter any other property may also be determined. The percentage magnetic saturation of each powder blend is then considered. To control the migration of binder among the powder blends, it is desirable, in the preferred tungsten carbide-cobalt system, for the percentage magnetic saturation of a test sample of the powder blend containing a greater amount of binder to be lower than the percentage magnetic saturation of a test sample of the powder blend containing less binder. Thus and only if necessary, appropriate additions are made to one, some or all the powder blends to obtain the desired relationships among the percentage magnetic saturation of each powder blend. With the relationships among the particle size or particle size distribution, binder content, and percentage magnetic saturation of each powder blend prescribed, a densification time and densification temperature, which produce a substantially densified article with no undesirable features, are selected. This final step may require an iterative process of evaluating the binder distribution among the regions of a sintered multiple-region article and then selecting a different densification temperature, densification time, or both that will produce the final targeted multiple-region article. In a preferred embodiment, pressure sintering enables densification of a multiple-region green body at a lower densification temperature, a shorter densification time, or both and this provides additional binder migration control. In this case the iterative process may also include the selection of sintering pressure in addition to temperature and time.

The present invention is illustrated by the following Examples. These Examples are provided to demonstrate and clarify various aspects of the present invention. The Examples should not be construed as limiting the scope of the claimed invention.

EXAMPLE 1

Commercially available compacts for roto-percussive rock drilling comprise monolithic tungsten carbide-cobalt cemented carbide (designated WC—Co). One monolithic WC—Co grade consists by weight of about 6 weight percent cobalt binder (Co) and the balance tungsten carbide (WC) hard component grains. This monolithic WC—Co grade has a hardness of 91.0 RA and a WC grain size that ranges from about 1 micrometer to about 8 micrometers. The present Example demonstrates, among other things, the methods for making compacts comprising at least two autogeneously metallugically bonded regions. Further, the present example demonstrates that the resultant multiple-region compact would be tougher than the monolithic WC—Co grade in the shaft region of the compact and more wear resistant than the monolithic WC—Co grade in the dome region of the compact.

Enhanced wear resistance of the dome region of a compact may be realized if any of the following, or combinations of the following, are achieved relative to the monolithic WC—Co grade: a finer grain size, a lower cobalt content or a higher hardness.

To make articles according to the present Example and in a preferred embodiment of the present invention, a granulated first powder blend and a granulated second powder blend were separately prepared. The first powder blend (depicted as 313 in FIGS. 3A, 3B and 3C) comprised, by weight, about 95.16 percent macrocrystalline tungsten carbide (Kennametal Inc. Fallon, Nev.), about 2.44 percent commercially available extra fine cobalt binder, about 2.15 percent paraffin wax lubricant, and about 0.25 percent of surfactant. Characterization of a test sintered specimen of only the first powder blend revealed that this monolithic WC—Co grade contained by weight about 2.5% cobalt, WC grains ranging in size from about one micrometer to about 5 micrometers, and had a Rockwell A hardness of about 92.4. The percent magnetic saturation of the monolithic WC—Co grade (using a LDJ Model SM-8001 saturation induction system connected to a LDJ Model 702 magnetic multimeter (LDJ Electronics Inc., Troy, Mich.) measured about 100 while metallography verified the absence of "C" porosity.

Enhanced toughness of the shaft region of a compact may be realized if any of the following, or combinations of the following, are achieved relative to the above monolithic WC—Co grade composition: a coarser grain size, a higher cobalt binder content, or a lower hardness.

The second powder blend (depicted as 314 in FIGS. 3A, 3B and 3C) comprised, by weight, about 90.57 percent macrocrystalline tungsten carbide (Kennametal Inc., Fallon, Nev.), about 7.03 percent commercially available cobalt binder, about 2.15 percent paraffin wax lubricant, and about 0.25 percent of a surfactant. A first characterization of a test sintered specimen revealed that the percentage magnetic saturation was higher than the desired value, thus a sufficient quantity of tungsten metal powder was added to the second powder blend to reduce the percentage magnetic saturation. A second characterization of a test sintered specimen of only the adjusted second powder blend revealed that this monolithic WC—Co grade contained by weight about 7.2% cobalt, WC grains ranging in size from about one micrometer to about 12 micrometers, and had a Rockwell A hardness of about 89.4. The percent magnetic saturation of this monolithic WC—Co grade measured about 91.

Figure 3A:
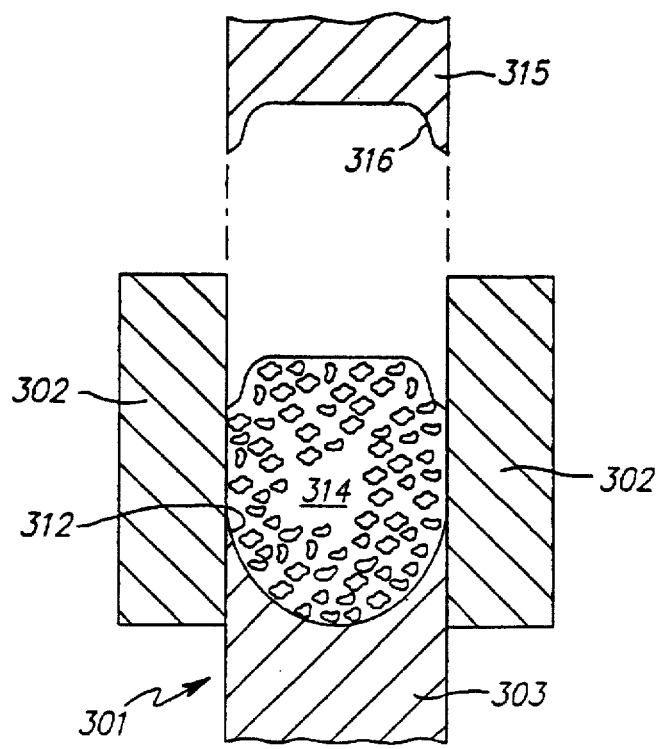
FIG. 3A is a cross-sectional schematic of a charged configuration 301 corresponding to the methods of Example 1.
Figure 3B:
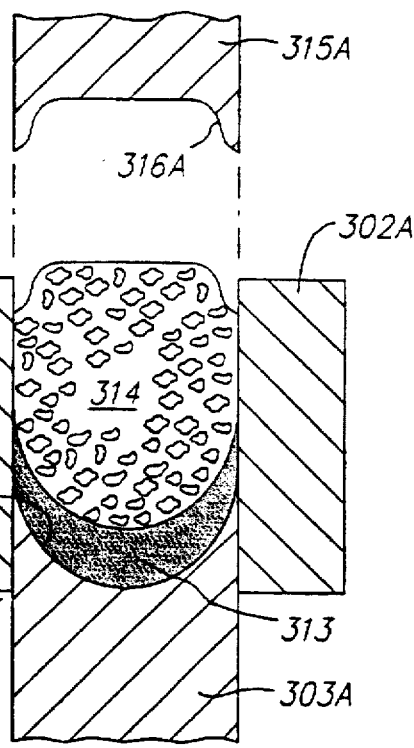
FIG. 3B is a cross-sectional schematic of a pressing configuration corresponding to the methods of Example 1.
Figure 3C:
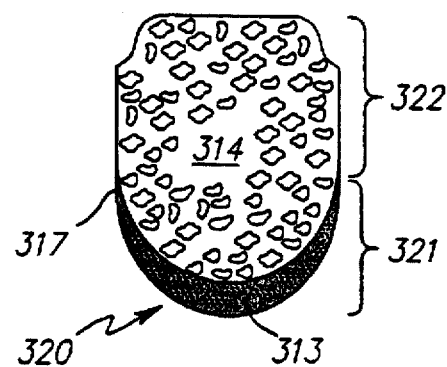
FIG. 3C is a cross-sectional schematic of a green body 320 made by the methods of Example 1.

The first powder blend 313 and the adjusted second powder blend 314 were then sequentially pressed into a green body 320 in a first die cavity having an about 20 mm (0.80 inch) diameter and a second oversized die cavity using pressing configurations 301 and 318 depicted schematically in FIG. 3A and FIG. 3B. Pressing configuration 301 included the engagement of a lower ram 303 having a forming surface 312 and a upper ram 315 having a forming surface 316 with a side cylindrical wall of the die 302. First about 55 grams of the second adjusted powder blend 314 were charged into the die cavity. After consolidation to a load of about 56,050 newtons (N)(12,600 pounds (lbs.)), precursor green bodies comprised solely of the adjusted second powder blend 314 were ejected and set aside for later processing. This process was repeated until a sufficient number of precursor green bodies comprised solely of the adjusted second powder blend 314 were made.

Then about 15.3 grams of the first powder blend 313 were placed in a second die cavity as schematically depicted in FIG. 3B as pressing configuration 318 which was slightly oversized relative to the original die cavity. Pressing configuration 318 included the engagement of a lower ram 303A having a forming surface 312A and a upper ram 315A having a forming surface 316A with a side cylindrical wall of the die 302A. Afterward, the precursor green bodies comprised solely of the adjusted second powder blend 314 were placed in contact with the first powder blend 313 and both were consolidated to a load of about 68,948 newtons (N)(15,500 pounds (lbs.)). After the load was removed, a multiple-region green body 320 was ejected from the die cavity and had a forward region 321 defined by a lower ram 303A and a rear region defined by the upper ram 315A. Further, the multiple-region green body 320 comprised compacted adjusted second 314 and first powder blend 313. This operation was repeated until a sufficient number of multiple-region green bodies comprising the first powder blend 313 and the adjusted second powder blend 314 had been formed. Additionally, several bodies comprised only of the first powder blend 313 and other bodies comprised only of the adjusted second powder blend 314 were formed. These bodies were used as control samples during sintering of the multiple-region green bodies 320.

Once a sufficient number of multiple-region green bodies 320 had been formed, the green bodies 320 and the control samples were placed in an Ultra-Temp pressure sintering furnace. The furnace and its contents were evacuated to about 0.665 kilopascal (kPa) (five (5) torr) and then raised from about room temperature to about 177° C. (350° F.) at a rate of about 3.3° C. (6° F.) per minute under vacuum; held at about 177° C. (350° F.) for about 15 minutes; heated from about 177° C. (350° F.) to about 371° C. (700° F.) at about 3.3° C. (6° F.) per minute; held at about 371° C. (700° F.) for about 90 minutes; heated from about 371° C. (700° F.) to about 427° C. (800° F.) at about 1.7° C. (3° F.) per minute; held at about 427° C. (800° F.) for about 45 minutes; heated from about 427° C. (800° F.) to about 538° C. (1000° F.) at about 1.4° C. (2.5° F.) per minute; held at about 538° C. (1000° F.) for about 12 minutes heated from about 538° C. (1000° F.) to about 593° C. (1100° F.) at about 1.4° C. (2.5° F.) per minute and then from about 593° C. (1100° F.) to about 1,121° C. (2050° F.) at about 4.4° C. (8° F.) per minute; held at about 1,121° C. (2050° F.) for about 30 minutes under a vacuum ranging from about 13 micrometers to about 29 micrometers; heated from about 1,121° C. (2050° F.) to about 1,288° C. (2350° F.) at about 4.4° C. (8° F.) per minute; held at about 1,288° C. (2350° F.) for about 30 minutes while argon was introduced to about 1.995 kPa (15 torr); heated from about 1,288° C. (2350° F.) to about 1441° C. (2625° F.) at about 3.3° C. (6° F.) per minute while argon was introduced to about a pressure of about 4,137 kPa (600 psi); held at about 1441° C. (2625° F.) for about 10 minutes;.and then the power to the furnace was turned off and the furnace and its contents were allowed to cool to about room temperature at about 5.6° C. (10° F.) per minute.

Several of the sintered articles (now having diameters of about 16.9 mm (0.664 inch)), including sintered control samples for the sintered only first powder blend and the sintered only adjusted second powder blend, were characterized using metallography, wet chemical analysis, magnetic properties characterization, hardness, and energy dispersive x-ray analysis (EDS).

Chemical analysis results indicated that after pressure sintering, the cobalt binder content of the second or rearward region, by weight, comprised about 6%. This is a decrease from about 7.2% of the sintered monolithic adjusted second powder blend. The grain size of the WC hard component, as determined from metallographic characterization, remained substantially unchanged and thus ranged from about one micrometer to about 12 micrometers. As intended, the composition of the second region in the rearward or shaft region of the compact now should be tougher than the monolithic WC—Co grade compact. That is, the second region possesses a coarser grain size (1–12 µm vs. 1–8 µm), a lower hardness (89.7 RA vs. 91.0 RA), and about the same cobalt binder content as the commercially available monolithic WC—Co grade.

At the same time, the cobalt binder migration from the shaft or second powder blend to the dome region or first powder blend was controlled such that the cobalt content of first region comprising the dome was about 4.5% (increased from about 3%) and thus became a desired composition with a hardness of 91.1 RA and a grain size of from about one micrometer to about 5 micrometers. In this manner the composition of the first region comprising the dome region was rendered more wear resistant than the commercially available monolithic WC—Co grade compact. That is since the first region possessed a finer grain size (14 5 µm vs. 1–8 µm), a lower cobalt content (4.5% vs. 6.0%), and a similar hardness (91.1 RA vs. 91.0 RA) it should be rendered more wear resistant.

Figure 4A:
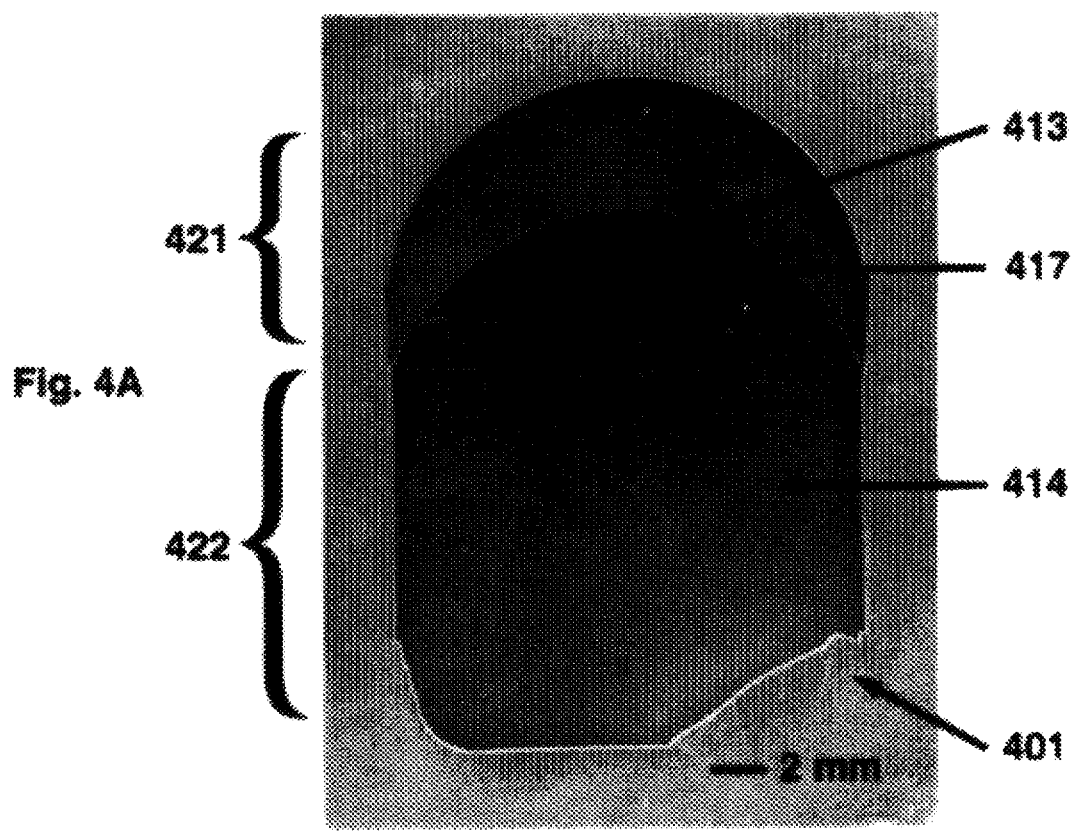
FIG. 4A is a photomicrograph taken at a magnification of about 4× of a longitudinal cross-section through sintered article 401 made according to the methods of Example 1.
Figure 4B:
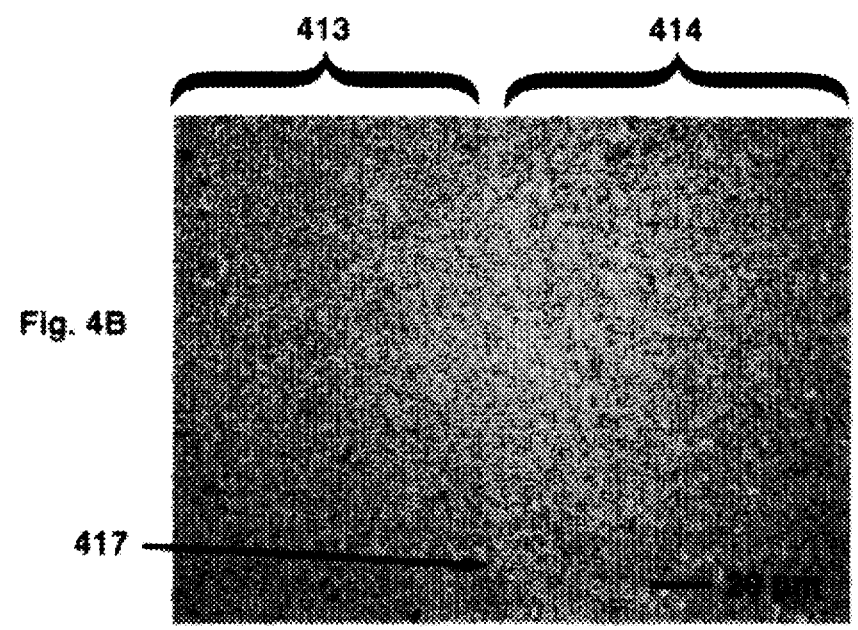
FIGS. 4B, 4C, and 4D are respectively photomicrographs taken at a magnification of about 500× of an interface 417 between a first region 413 and a second region 414, a first region 413, and a second region 414 of an article made according to the methods of Example 1.
Figure 4C:
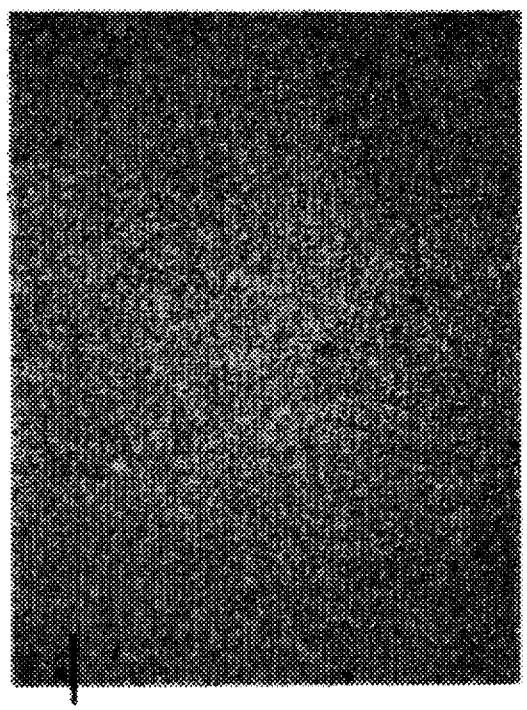
Figure 4D:
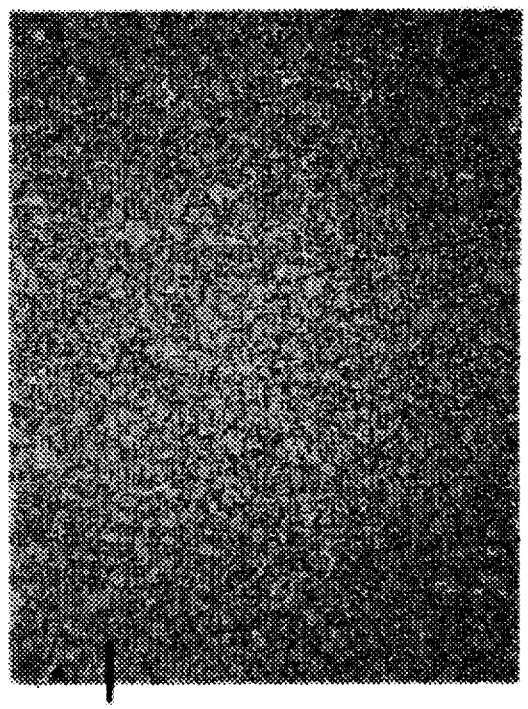
Figure 5:
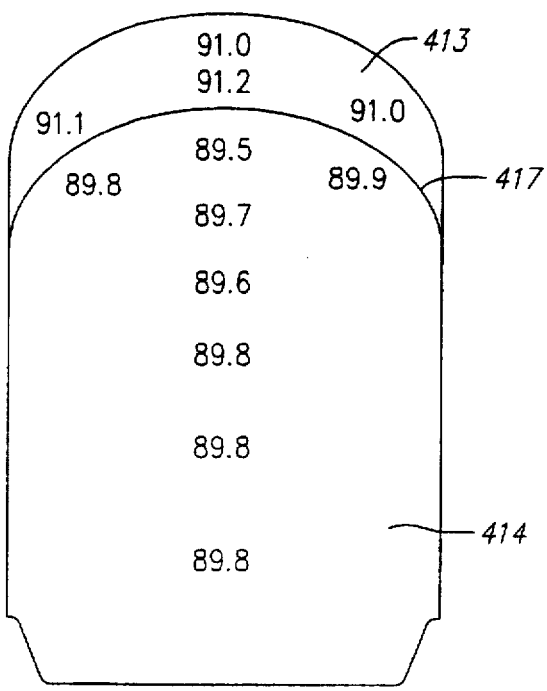
FIG. 5 corresponds to the results of hardness measurements at various locations (i.e., hardness distribution profile) of a longitudinal cross section of an article made according to the methods of Example 1.

FIG. 4A is a photomicrograph at about 4× of longitudinal cross sections of sintered article 401 having a first region 413 contacting a second region 414 at an interface 417. A forward region 421 corresponds to the forward region of a multiple-region green body and the rear region 422 corresponds to the rear region of a green body. Microstructures of the interface 417 between the first region 413 and the at least one additional region 414 at a magnification of about 500× is shown in FIG. 4B, while at a magnification of about 1500× in FIG. 4E. FIGS. 4C and 4D are photomicrographs of a first region 413 and an second region 414 at a magnification of about 500×, while FIGS. 4F and 4G are photomicrographs of the first region 413 and the second region 414 at a magnification of about 1500×. The constituents of the first region 413 and the second region 414 are identified in FIGS. 4E, 4F and 4G and include a cobalt alloy binder 425, fine grain tungsten carbide 426 and the coarse grain tungsten carbide 427. The autogeneously formed bond line 417 is clearly seen in FIG. 4E as a sudden change in tungsten carbide grain size and cobalt alloy binder content. There is an excellent autogeneously produced metallurgical bond which is free of cracks and inclusions. These dense, sintered articles are also free of eta-phase and "C" porosity. FIG. 5 presents the results of a hardness profile on an article which indicate that the hardness of the first region 413 (dome or tip region of this article, Rockwell A≅91.0–91.2) is higher than the hardness of the second region 414 (rear or shaft region of the present article, Rockwell A≅89.5–89.9).

Figure 6:
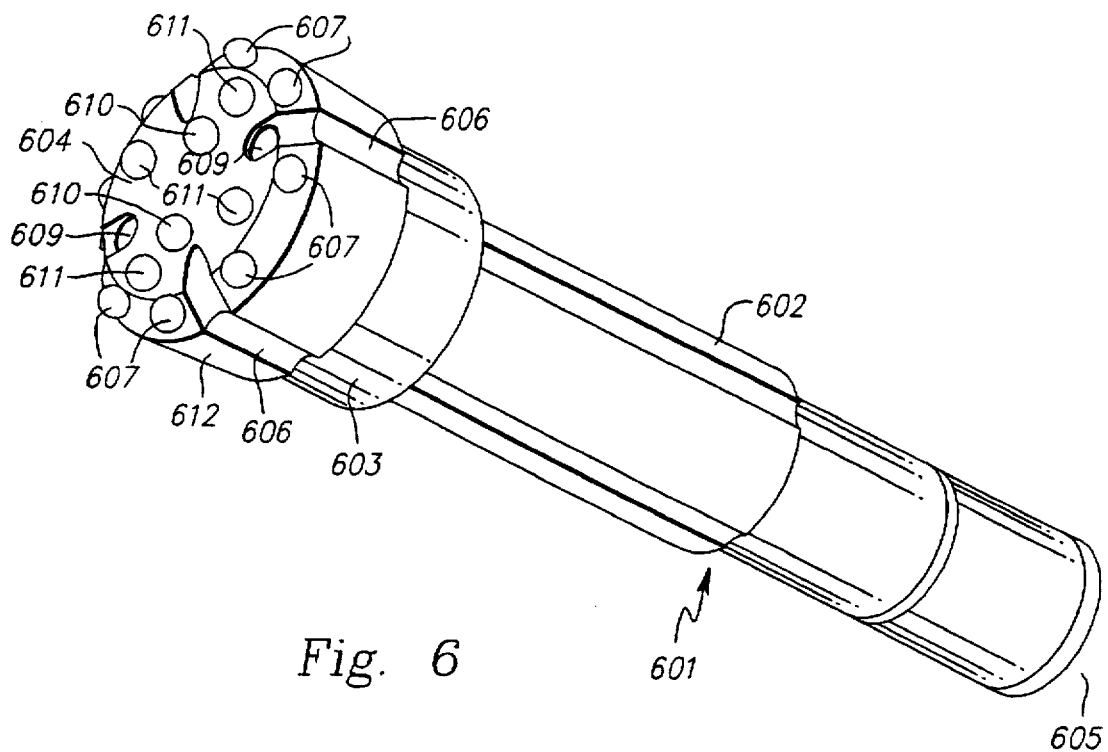
FIG. 6 corresponds to a schematic of a compact bit 601 incorporating an article made by the methods of Example 1.

FIG. 6 is a schematical depiction of a tool 601 for drilling holes in earth formations comprised of a bit body 602 with one end 605 adapted for connection to a driving instrumentality while the other end 604, and which may be considered a front end, forms a working face which is generally planar and perpendicular to the longitudinal axis of the bit body 602. The bit body comprises a peripheral wall 612 extending rearwardly from front end 604 and advantageously tapering inwardly slightly in the rearward direction.

Rearwardly of peripheral wall 612, the bit body 602 may reduce in diameter for the flow of reduced material backwardly along bit body 602 and the bit body, may furthermore, be provided with axial flutes 606 for the flow of reduced material taken by the bit or fluid bores 609 for both the cooling of the bit body 602 and facilitating the flow of reduced material. A bit body may also incorporate both axial flutes 606 and fluid bores 609.

The front working end of body 602 is provided with a plurality of axial holes (not shown in FIG. 6) in which are mounted rod-like compacts 610,611 having domed outer ends which protrude axially outwardly from working face 604. Compacts 610,611 may be press fitted in bores or may be otherwise affixed therein, as by brazing. The compacts 610,611 are distributed radially and circumferentially over face 604 and thereby reduce a formation against which the bit 601 is impacted.

Near the juncture of peripheral wall 612, with forward end 604 of the bit body 602, there are provided axially inclined bores (not shown in FIG. 6) in which are mounted compacts 607 which also have domed outer ends. Compacts 607 may be identical with compacts 610, 611 if desired.

It can be seen in the drawings that the outer ends of compacts 610, 611 not only protrude axially from front end 604 of the bit body 602, but also protrude radially as well. Compacts 607, which are distributed about the circumference of the bit body 602, thus, serve as gage compacts and tend to maintain the size of the hole being drilled by the bit substantially constant.

This is important because, if the bit 601 wears in the circumferential direction as drilling proceeds, the hole formed by the bit 601 will be tapered, and it will be difficult to introduce a new bit into the hole. The gage compacts, thus, have an extremely important function to carry out during the operation of the bit. The holding of the gage of a hole being drilled may enhanced by the provision of at least one further row of compacts extending radially into the periphery of bit body 602 within the range of peripheral wall 612 and spaced axially rearwardly from the forward end 604 of the bit body 602. The compacts are distributed circumferentially about the bit body 602 and each gage compact 607 preferably has a respective further compact in axial alignment therewith.

EXAMPLE 2

Figure 8:
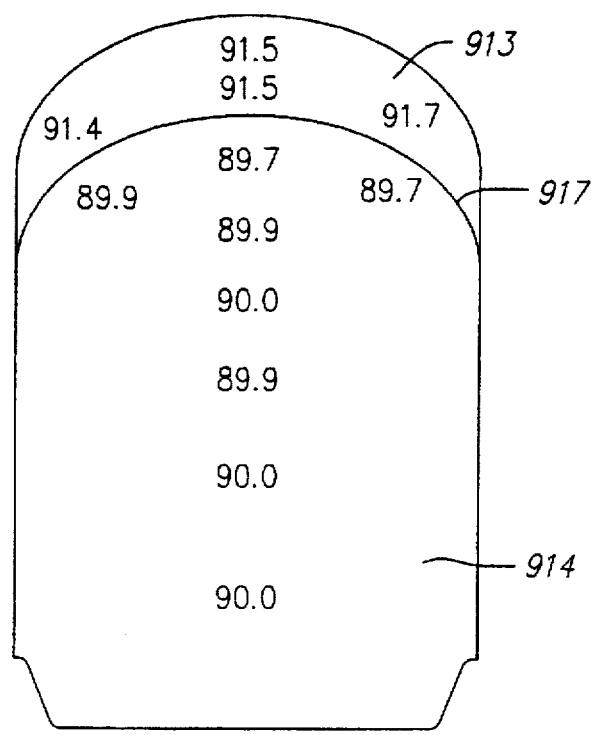
FIG. 8 corresponds to the results of hardness measurements at various locations (i.e., hardness distribution profile) of a longitudinal cross section of an article made according to the methods of Example 2.

The methods of Example 1 were substantially repeated except that the second blend 314 comprised, by weight, about 91.55 percent macrocrystalline tungsten carbide (Kennametal inc., Fallon, Nev.), about 6.05 percent commercially available cobalt binder, about 2.15 percent paraffin wax lubricant, and about 0.25 percent of a surfactant. Characterization of a test sintered specimen revealed that this monolithic WC—Co grade contained by weight about 6.2% cobalt, WC grains ranging in size from about one micrometer to about 12 micrometers, and had a Rockwell a hardness of about 89.7. The percent magnetic saturation of the monolithic WC—Co grade measured about 89. Microstructures of the interface 717 between the first region 713 and the at least one additional region 714 at a magnification of about 500× is shown in FIG. 7A, while at a magnification of about 1500× in FIG. 7D. FIGS. 7B and 7C are photomicrographs of a first region 713 and an second region 714 at a magnification of about 500×, while FIGS. 7E and 7F are photomicrographs of the first region 713 and the second region 714 at a magnification of about 1500×. The constituents of the first region 713 and the second region 714 are identified in FIGS. 7D, 7E and 7F and include a cobalt alloy binder 725, fine grain tungsten carbide 726 and the coarse tungsten grain carbide 727. The autogeneously formed bond line 717 is clearly seen in FIG. 7D as a sudden change in tungsten carbide grain size and cobalt alloy content. These is an excellent autogeneously produced metallurgical bond which is free of cracks and inclusions. These dense, sintered articles are also free of eta-phase and "C" porosity. FIG. 8 presents the results of a hardness profile measurement on a resultant article which indicates that the hardness of the first region (dome or tip region of this article, Rockwell A≅91.4–91.7) is higher than the hardness of the second region (rear or shaft region of the present article, Rockwell A≅89.7–90.0).

EXAMPLE 3

The present Example demonstrates, among other things, the methods of tailoring of powder blends to control binder migration among the blends during sintering and form a multiple-region body comprised of specified composition in various region including, for example, a Shaft region and a dome region. Furthermore, the present Example demonstrates the effect of magnetic saturation on controlling cobalt alloy binder migration in a multiple-region mining compact made from two distinct WC—Co powder blends. Specifically the multiple-region mining compact would comprised a dome region that is more wear resistant than a shaft region that is significantly tougher than the dome region. To achieve these results in a compact the dome region should comprise, by weight, about 7–8 percent cobalt binder and the shaft region should comprise, by weight, about 10 percent cobalt binder.

To make an article according to the present Example, a first powder blend and a granulated second powder blend were separately prepared. The first powder blend comprised, by weight, about 94.57 percent diffusion carburized tungsten carbide (Kennametal Inc. Henderson, N.C.), about 3.03 percent commercially available extra fine cobalt binder, about 2.15 percent paraffin wax lubricant, and about 0.25 percent of surfactant. Characterization of a test sintered specimen of only the first powder blend revealed that this monolithic WC—Co grade contained by weight about 3.1% cobalt, WC grains ranging in size from about one micrometer to about 5 micrometers with a significant number from about 2 micrometer to about 4 micrometers, and had a Rockwell A hardness of about 92.4. The percent magnetic saturation of the monolithic WC—Co grade measured about 94 while metallography verified the absence of "C" porosity.

The second powder blend comprised, by weight, about 85.79 percent macrocrystalline tungsten carbide (Kennametal Inc., Fallon, Nev.), about 11.81 percent commercially available cobalt binder, about 2.15 percent paraffin wax lubricant, and about 0.25 percent of a surfactant. A first characterization of a test sintered specimen revealed that the percentage magnetic saturation was higher than the desired value, thus a sufficient quantity of tungsten metal powder (about 1.6 percent by weight of the powder blend) was added to the second powder blend to reduce the percentage magnetic saturation. A second characterization of a test sintered specimen of only the adjusted second powder blend revealed that this monolithic WC—Co grade contained by weight about 12.1% cobalt alloy binder, WC grains ranging in size from about one micrometer to about 9 micrometers with a significant number from about 6 micrometer to about 9 micrometers, and had a Rockwell A hardness of about 87.8. The percent magnetic saturation of this monolithic WC—Co grade measured about 87 while metallography verified the absence of eta phase.

The first powder blend and the adjusted second powder blend were then sequentially charged into a die cavity having an about 20 mm (0.80 inch) diameter and then pressed into a green body. First about 9 grams of the first powder blend and then about 25 grams of the second adjusted powder blend were charged into the die cavity, and consolidated to a load of about 55,160 newtons (N)(8000 pounds (lbs.)). After the load was removed, a multiple-region green body was ejected from the die cavity having a forward region defined by a lower ram and a rear region defined by an upper ram. This operation was repeated until a sufficient number of multiple-region green bodies comprising the first powder blend and the adjusted second powder blend had been formed. Additionally, several bodies comprised only of the first powder blend and other bodies comprised only of the adjusted second powder blend were formed. These bodies were used as control samples during sintering of the multiple-region green bodies.

Once a sufficient number of multiple-region green bodies had been formed, the green bodies and the control samples were densified substantially according to the methods of Example 1.

Figure 9A:
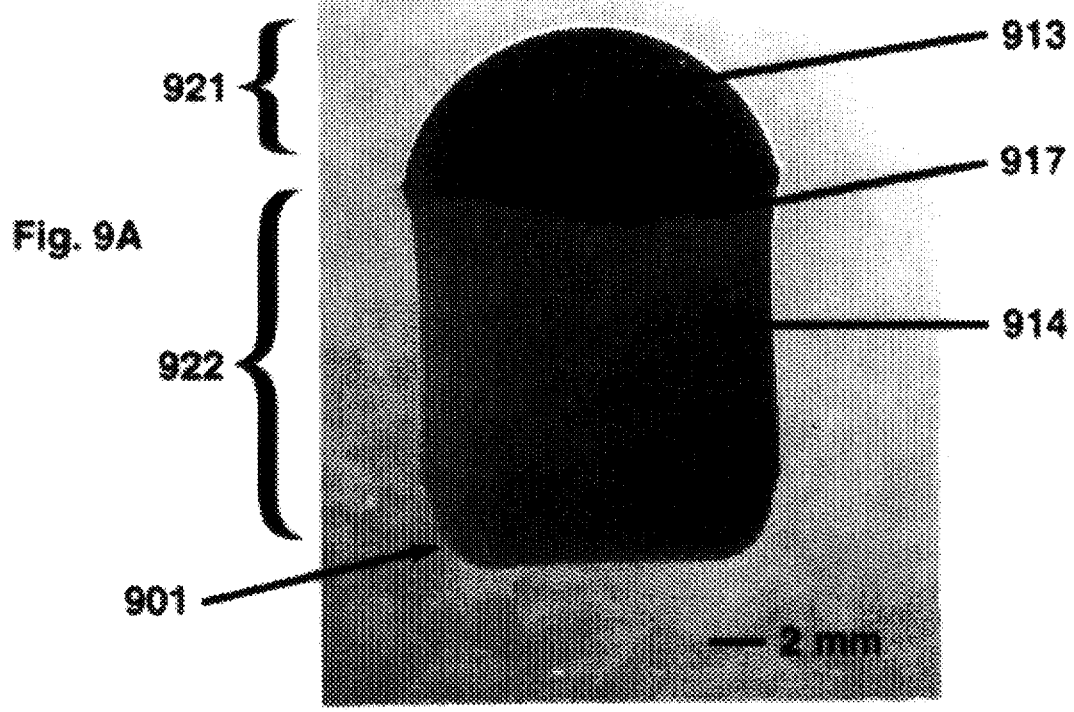
FIG. 9A is a photomicrograph taken at a magnification of about 4× of a longitudinal cross-section through sintered article 901 made according to the methods of Example 3.
Figure 9E:
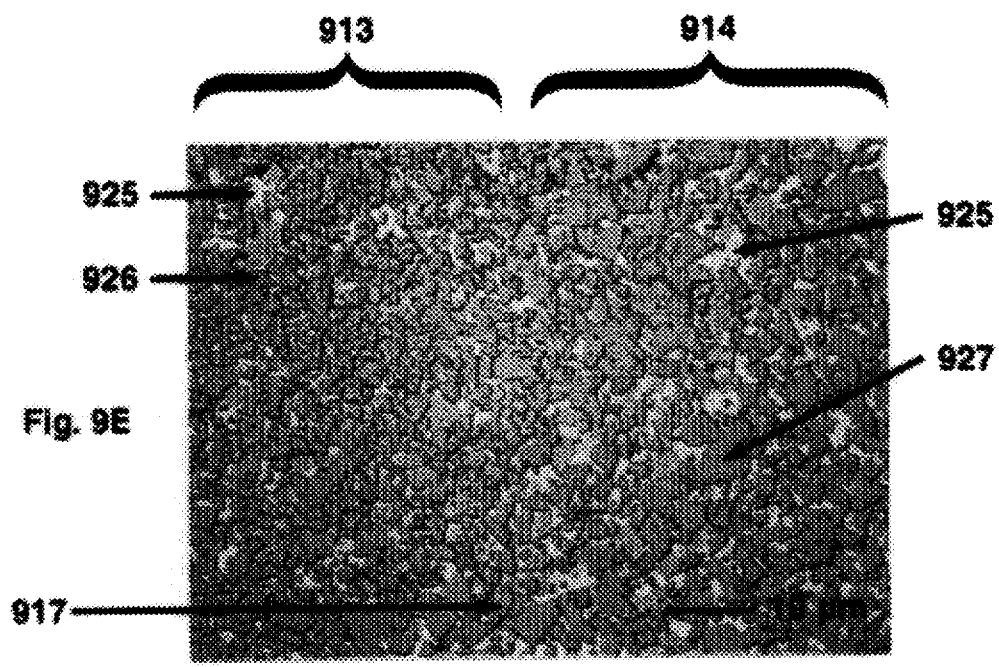
FIGS. 9E, 9F and 9G are respectively photomicrographs taken at a magnification of about 1,500× of an interface 917 between a first region 913 and a second region 914, a first region 913, and a second region 914 of an article made according to the methods of Example 3.
Figure 9F:
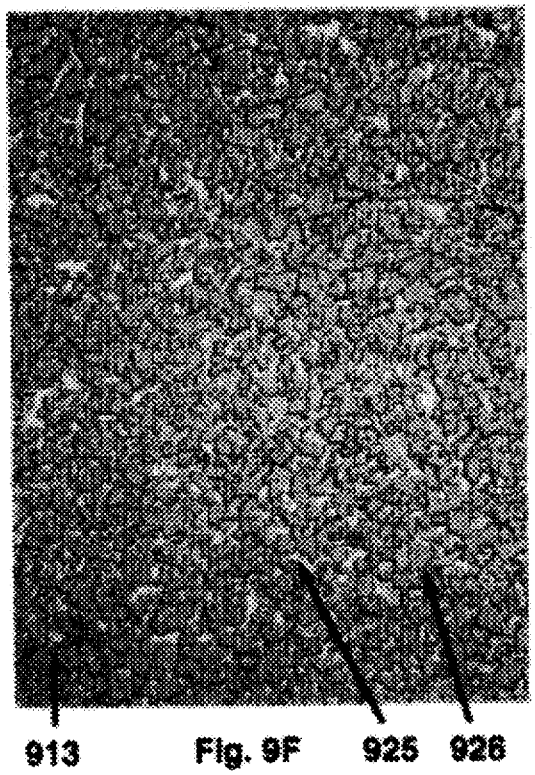
Figure 9G:
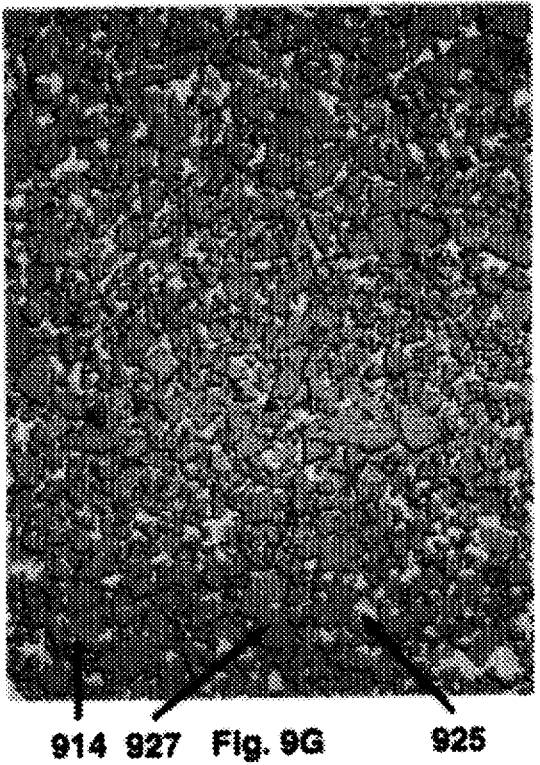

FIG. 9A is a photomicrograph at about 3.5× of longitudinal cross sections of sintered article 901 having a first region 913 contacting a second region 914 at an interface 917. A forward region 921 corresponds to the forward region of a multiple-region green body and the rear region 922 corresponds to the rear region of a green body. Microstructures of the interface 917 between the first region 913 and the at least one additional region 914 at a magnification of about 500× is shown in FIG. 9B, while at a magnification of about 1500× in FIG. 9E. FIGS. 9C and 9D are photomicrographs of a first region 913 and an second region 914 at a magnification of about 500×, while FIGS. 9F and 9G are photomicrographs of the first region 913 and the second region 914 at a magnification of about 1500×. The constituents of the first region 913 and the second region 914 are identified in FIGS. 9E, 9F and 9G and include a cobalt alloy binder 925, fine grain tungsten carbide 926 and the coarse grain tungsten carbide 927. The autogeneously formed bond line 917 is clearly seen in FIG. 9E as a sudden change in tungsten carbide grain size and cobalt alloy binder content. There is an excellent autogeneously produced metallurgical bond which is free of cracks and inclusions. These dense, sintered articles are also free of eta-phase and "C" porosity.

Figure 10:
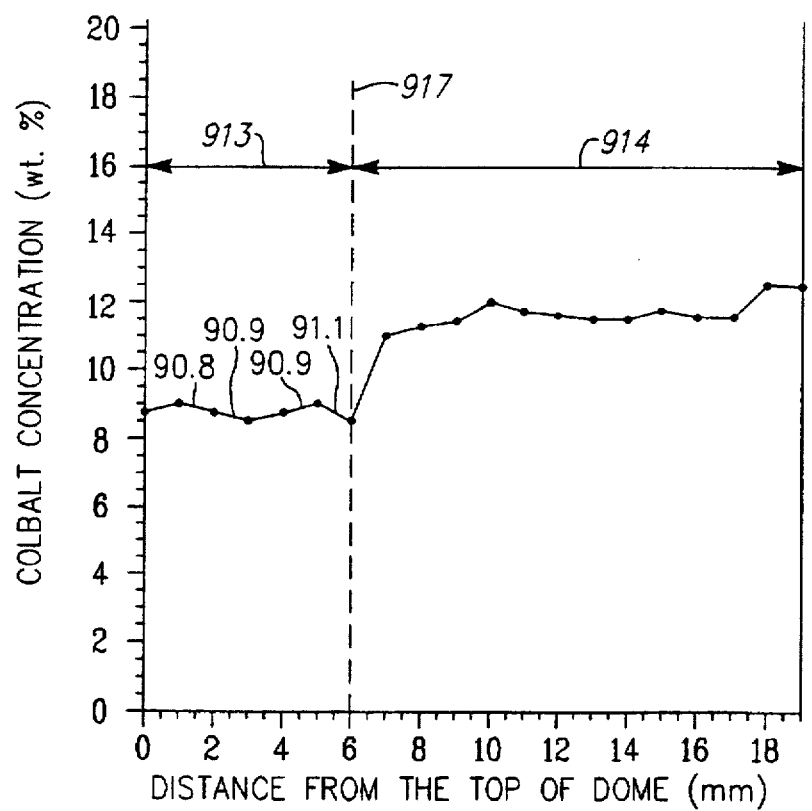
FIG. 10 corresponds to the results of binder concentration determinations using EDS techniques as a function of distance from the forward most portion of an article made according to the methods of Example 3.

To quantify the cobalt distribution within the compact made by the method of the present Example, a sintered multiple-region compact was cut along the center longitudinally to provide a 6.4 mm (0.25 inch) thick section that was subsequently mounted, ground, and polished. The mounted, ground, and polished sample was analyzed by standardless spot probe analysis using energy dispersive x-ray analysis (EDS) from the dome back and toward the shaft of the compact. Specifically, a JSM-6400 scanning electron microscope (Model No. ISM64-3, JEOL LTD, Tokyo, Japan) equipped with a $LaB_6$ cathode electron gun system and an energy dispersive x-ray system with a silicon-lithium detector (Oxford Instruments Inc., Analytical System Division, Microanalysis Group, Bucks, England) at an accelerating potential of about 20 key was used. The scanned areas measured about 125 micrometers by about 4 micrometers. Each area was scanned for an equivalent time interval (about 50 seconds live time). The step size between adjacent areas was about 1 mm (0.039 inch). FIG. 10 shows the results of this standardless analysis which demonstrates how the cobalt alloy binder migration has been controlled as a result of having the magnetic saturation of the shaft region significantly lower relative to that of the dome region. Note also the uniformity of the cobalt alloy binder concentration through the dome region right up to interface 917 where it rises abruptly to become an integral part of the tougher shaft region. The uniform level of the cobalt throughout the dome region right up to the interface of the two compositions is a very significant attribute of the present embodiment. Superimposed on FIG. 10 is the measured Rockwell hardness along various increments in the dome region of the compact that show the substantial uniformity of the hardness of the dome region. The wear resistance of the dome region is therefore relatively constant throughout and will be maintained as the surface of the dome of the compact is subjected to in-service wear or to re-grinding during any subsequent reconditioning process.

After pressure sintering, the cobalt alloy binder content and physical properties of the shaft region were evaluated. The cobalt alloy binder content, which substantially reached the target, was about 10.4%; the hardness was about 89.1; and the grain size remained unchanged with a significant number from about 6 micrometer to about 9 micrometers. The cobalt alloy binder content and physical properties of the dome region were, likewise, evaluated. The cobalt alloy binder content, which substantially reached the target, was about 8.1%; the hardness was 90.9 RA; and the grain size remained unchanged with a significant number from about 2 micrometer to about 4 micrometers.

In the manner just described, the targeted compositions of the at least two region of the compact and attendant properties were achieved. The dome region comprised of a wear resistant composition and concurrently the shaft region now comprised of a tougher composition because of the following relationships: The cobalt content of the dome region is less than that of the shaft region (8.1% vs. 10.4%); the grain size of the dome region is less than that of the shaft region (2–4 μm vs. 6–9 μm); the hardness of the dome region is higher than that of the shaft region(90.9 RA vs. 89.1 RA).

What is claimed is:

1. A cermet article of manufacture comprising:
   a first region of cermet comprised of tungsten carbide grains having a first grain size and a first cobalt based binder at a first binder concentration;
   a second region of cermet comprised of tungsten carbide grains having a second grain size and a second cobalt based binder at a second binder concentration;
   wherein the first region of cermet is autogeneously metallurgically bonded to the second region of cermet;
   wherein the first binder concentration is less than the second binder concentration and the first grain size is less than the second grain size;
   wherein the first region has a first percentage magnetic saturation value and the second region of cermet has a second percentage magnetic saturation value; and
   wherein the first percentage magnetic saturation is greater than the second percentage magnetic saturation.

2. The cermet article of manufacture according to claim 1 wherein the second region of cermet is free of eta phase.

3. The cermet article of manufacture according to claim 1 wherein the first region of cermet is free of "C" porosity.

4. The cermet article of manufacture according to claim 2 wherein the first region of cermet is free of "C" porosity.

5. The cermet article of manufacture according to claim 1 wherein the first percentage magnetic saturation of the first region of cermet ranges from about 79 to about 100 and the second percentage magnetic saturation of the second region of cermet ranges from about 79 to about 100.

6. The cermet article of manufacture according to claim 1 wherein the first grain size of the first region of cermet ranges from about submicrometer to about 30 micrometers and the second grain size of the second region of cermet ranges from about submicrometer to about 30 micrometers.

7. The cermet article of manufacture according to claim 1 wherein the first cobalt based binder concentration of the first region of cermet, by weight percent, ranges from about 1 to about 30 and the second cobalt based binder concentration of the second region of cermet, by weight percent, ranges from about 2 to about 30.

8. The cermet article of manufacture according to claim 1, wherein a hardness of the first region of cermet comprises between about 91.4 and 91.7 Rockwell A.

9. The cermet article of manufacture according to claim 1, wherein a hardness of the first region of cermet comprises between about 90.8 and 91.1 Rockwell A.

10. The cermet article of manufacture according to claim 1, wherein a hardness of the second region of cermet comprises between about 89.7 and 90.0 Rockwell A.

11. The cermet article of manufacture according to claim 1, wherein the first binder concentration comprises, by weight, between about one percent and 30 percent.

12. The cermet article of manufacture according to claim 1, wherein the first binder concentration comprises, by weight, between about one percent and 15 percent.

13. The cermet article of manufacture according to claim 1, wherein the first binder concentration comprises, by weight, between about two percent and eight percent.

14. The cermet article of manufacture according to claim 1, wherein the first binder concentration comprises, by weight, between about two percent and ten percent.

15. The cermet article of manufacture according to claim 1, wherein the first binder concentration comprises, by weight, between about three percent and six percent.

16. The cermet article of manufacture according to claim 11, wherein the second binder concentration comprises, by weight, between about two percent and 30 percent.

17. The cermet article of manufacture according to claim 12, wherein the second binder concentration comprises, by weight, between about two percent and 20 percent.

18. The cermet article of manufacture according to claim 13, wherein the second binder concentration comprises, by weight, between about four percent and 14 percent.

19. The cermet article of manufacture according to claim 14, wherein the second binder concentration comprises, by weight, between about six percent and ten percent.

20. The cermet article of manufacture according to claim 1, wherein the first grain size ranges from about submicrometer to about 12 micrometers.

21. The cermet article of manufacture according to claim 1, wherein the first grain size ranges from about one micrometer to about eight micrometers.

22. The cermet article of manufacture according to claim 1, wherein the first grain size ranges from about one micrometer to about five micrometers.

23. The cermet article according to claim 1, wherein the cermet article is incorporated a portion of a tool for use in one of construction, mining, agriculture, and machining.

24. The cermet article according to claim 1, wherein the cermet article is incorporated in a portion of a tool comprising a drill for forming holes in earth formations.

25. The cermet article according to claim 24, wherein the cermet article comprises a compact comprising a domed compact end comprising the first region,
   a second compact end comprising the second region, and
   a compact body extending from the domed compact end to the second compact end; and
   wherein the tool comprises a bit body comprising a first body end formed as a working face,
   a second body end adapted for connection to a driving instrumentality,
   a peripheral wall extending from first body end to the second body end,
   a plurality of compacts distributed radially and circumferentially over the working face and mounted in axial holes within the bit body and at the working face such that the domed body ends of the compacts protrude axially outwardly from the working face, and a plurality of axially inclined compacts distributed circumferentially about the bit body and near the juncture of the peripheral wall with first body end of the bit body such that the domed compact ends protrude axially and radially outwardly from the working face.

26. A cutting element for attachment to a steel body comprising:

a first portion comprising a base adapted to be attached to the steel body, and a second portion adapted to at least partially project above the first portion and the steel body;

the cutting element having a first tungsten carbide-cobalt based cermet which forms at least the majority of the surface of the first portion;

and a second tungsten carbide-cobalt based cermet which forms at least a majority of the surface of the second portion;

wherein the first tungsten carbide cobalt based cermet has a first percentage magnetic saturation and the second tungsten carbide-cobalt based cermet has a second percentage magnetic saturation;

wherein the second percentage magnetic saturation is less than the first percentage magnetic saturation; and wherein a cobalt binder concentration of the second tungsten carbide-cobalt based cermet comprises more than a cobalt binder concentration of the first tungsten carbide-cobalt based cermet.

27. The cutting element according to claim 26 wherein the cobalt binder concentration throughout a majority of the second tungsten carbide-cobalt based cermet is substantially uniform.

28. The cutting element according to claim 26 wherein the first tungsten carbide-cobalt based cermet has a first tungsten carbide grain size and the second tungsten carbide-cobalt based cermet has a second tungsten carbide grain size; and wherein the second tungsten carbide grain size is greater than the first tungsten carbide grain size.

29. The cutting element according to claim 26 wherein the first percentage magnetic saturation comprises a number ranging from about 79 to 100.

30. The cutting element according to claim 29 wherein no "C" porosity is present in the first tungsten carbide-cobalt based cermet.

31. The cutting element according to claim 26 wherein the second percentage magnetic saturation comprises a number ranging from about 79 to 100.

32. The cutting element according to claim 30 wherein there is no eta phase present in the second tungsten carbide-cobalt based cermet.

33. The cutting element according to claim 31 wherein there is no eta phase present in the second tungsten carbide-cobalt based cermet.

34. The cutting element according to claim 26 wherein the tungsten carbide-cobalt based cermet has a hardness which is substantially uniform throughout a majority of the second portion, wherein the second portion comprises a tip.

35. The cutting element according to claim 26, wherein the first tungsten carbide-cobalt based cermet has a hardness comprising between about 91.4 and 91.7 Rockwell A.

36. The cutting element according to claim 26, wherein the first tungsten carbide-cobalt based cermet has a hardness comprising between about 90.8 and 91.1 Rockwell A.

37. The cutting element according to claim 26, wherein the second tungsten carbide-cobalt based cermet has a hardness comprising between about 89.7 and 90.0 Rockwell A.

38. The cutting element according to claim 20, wherein the cobalt binder concentration of the first tungsten carbide-cobalt based cermet comprises, by weight, between about one percent and 30 percent.

39. The cutting element according to claim 26, wherein the cobalt binder concentration of the first tungsten carbide-cobalt based cermet comprises, by weight, between about one percent and 15 percent.

40. The cutting element according to claim 26, wherein the cobalt binder concentration of the first tungsten carbide-cobalt based cermet comprises, by weight, between about two percent and eight percent.

41. The cutting element according to claim 26, wherein the cobalt binder concentration of the first tungsten carbide-cobalt based cermet comprises, by weight, between about three percent and six percent.

42. The cutting element according to claim 38, wherein the cobalt binder concentration of the second tungsten carbide-cobalt based cermet comprises, between about two percent and 30 percent.

43. The cutting element according to claim 39, wherein the second binder concentration of the second tungsten carbide-cobalt based cermet comprises, by weight, between about two percent and 20 percent.

44. The cutting element according to claim 40, wherein the second binder concentration of the second tungsten carbide-cobalt based cermet comprises, by weight, between about four percent and 14 percent.

45. The cutting element according to claim 41, wherein the second binder concentration of the second tungsten carbide-cobalt based cermet comprises, by weight, between about six percent and ten percent.

46. The cutting element according to claim 28, wherein the second tungsten carbide grain size ranges from about one micrometer to about 20 micrometers.

47. The cutting element according to claim 28, wherein the second tungsten carbide grain size ranges from about one micrometer to about 12 micrometers.

48. The cutting element according to claim 28, wherein the second tungsten carbide grain size ranges from about three micrometer to about ten micrometers.

49. A cermet article of manufacture comprising:

a first region of cermet comprised of tungsten carbide grains having a first grain size from about one micrometer to about eight micrometers and a first cobalt based binder at a first binder concentration comprising about one percent to 15 percent by weight;

a second region of cermet comprised of tungsten carbide grains having a second grain size from about one micrometer to about 12 micrometers and a second cobalt based binder at a second binder concentration comprising about two percent and 20 percent;

wherein the first region of cermet is autogeneously metallurgically bonded to the second region of cermet;

wherein the first binder concentration is less than the second binder concentration and the first grain size is less than the second grain size;

wherein the first region has a first percentage magnetic saturation value and the second region of cermet has a second percentage magnetic saturation value; and wherein the first percentage magnetic saturation is greater than the second percentage magnetic saturation.

\* \* \* \* \*